(12) United States Patent
Kato et al.

(10) Patent No.: US 11,868,186 B2
(45) Date of Patent: Jan. 9, 2024

(54) OPENING AND CLOSING MECHANISM AND ELECTRONIC DEVICE

(71) Applicant: Huawei Technologies Co., Ltd., Guangdong (CN)

(72) Inventors: Hideo Kato, Yokohama (JP); Yaming Jiang, Wuhan (CN); Lei Bai, Wuhan (CN); Mengying Pan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 601 days.

(21) Appl. No.: 15/733,633

(22) PCT Filed: Apr. 17, 2018

(86) PCT No.: PCT/CN2018/083440
§ 371 (c)(1),
(2) Date: Sep. 22, 2020

(87) PCT Pub. No.: WO2019/200549
PCT Pub. Date: Oct. 24, 2019

(65) Prior Publication Data
US 2021/0018960 A1     Jan. 21, 2021

(51) Int. Cl.
*G06F 1/16*     (2006.01)
*E05D 3/12*     (2006.01)
(Continued)

(52) U.S. Cl.
CPC ............ *G06F 1/1681* (2013.01); *E05D 3/12* (2013.01); *E05D 7/0009* (2013.01); *E05D 11/00* (2013.01); *E05Y 2900/606* (2013.01)

(58) Field of Classification Search
None
See application file for complete search history.

(56) References Cited

U.S. PATENT DOCUMENTS

2009/0075702 A1* 3/2009 Kubodera ............. H04M 1/022
455/566
2018/0066465 A1* 3/2018 Tazbaz ................ E05D 11/1007

FOREIGN PATENT DOCUMENTS

CN     101388918 A     3/2009
CN     102635627 A     8/2012
(Continued)

*Primary Examiner* — Anthony Q Edwards
*Assistant Examiner* — Rashen E Morrison
(74) *Attorney, Agent, or Firm* — WOMBLE BOND DICKINSON (US) LLP

(57) ABSTRACT

An opening and closing mechanism includes: a first rotating shaft and a second rotating shaft that are disposed in parallel, a first telescopic part disposed on the first rotating shaft and a second telescopic part disposed on the second rotating shaft, and the first rotating shaft and the second rotating shaft are rotationally connected. The first telescopic part includes a first connection part connected to the first rotating shaft and a first body fastening part slidable along the first connection part, and the first body fastening part is configured to fasten a first body of the electronic device. The second telescopic part includes a second connection part connected to the second rotating shaft and a second body fastening part slidable along the second connection part, and the second body fastening part is configured to fasten a second body of the electronic device.

20 Claims, 37 Drawing Sheets

(51) Int. Cl.
*E05D 7/00* (2006.01)
*E05D 11/00* (2006.01)

(56) References Cited

FOREIGN PATENT DOCUMENTS

| | | |
|---|---|---|
| CN | 104282224 A | 1/2015 |
| CN | 105202010 A | 12/2015 |
| CN | 105782228 A | 7/2016 |
| CN | 205895879 U | 1/2017 |
| CN | 206723246 U | 12/2017 |
| CN | 206918043 U | 1/2018 |
| CN | 107654484 A | 2/2018 |
| CN | 207117712 U | 3/2018 |
| CN | 207200775 U | 4/2018 |
| EP | 2829945 A2 | 1/2015 |
| EP | 3393110 A1 | 10/2018 |
| KR | 20100107999 A | 10/2010 |
| WO | 2015012830 A1 | 1/2015 |

\* cited by examiner

OPENING AND CLOSING MECHANISM AND ELECTRONIC DEVICE

CROSS-REFERENCE TO RELATED APPLICATIONS

This application is a national stage of International Application No. PCT/CN2018/083440, filed on Apr. 17, 2018, the disclosure of which is incorporated herein by reference in its entirety.

TECHNICAL FIELD

Embodiments of this application relate to the field of notebook computer structures, and in particular, to an opening and closing mechanism and an electronic device.

BACKGROUND

With popularization of a notebook computer, a user has increasingly high requirements on the notebook computer. At present, more users like a dual-screen notebook computer provided on a market.

In the prior art, the dual-screen notebook computer has two liquid crystal displays (LCDs) and one rotating shaft structure, and the two LCDs are connected by using the rotating shaft structure of the notebook computer, to open and close the notebook computer. At least one of the two LCDs has a touch function, and the LCD having the touch function may be used as a keyboard, so that the user can implement external input through a touch operation. In a current dual-screen notebook computer, when two LCDs are used as screens for display, it is necessary to ensure that there is no gap between the two LCDs when the two LCDs are disposed side by side. However, a rotating shaft structure that is of the dual-screen notebook computer and that meets the foregoing requirement is usually disposed on a rear side of the LCD, and an opening and closing angle can reach only 200°, which cannot meet a 360° opening and closing requirement of the user. However, in a dual-screen notebook computer that meets the 360° opening and closing requirement, there is a relatively large gap between two LCDs when the two LCDs are disposed side by side, and full-screen experience cannot be provided for a user.

SUMMARY

Embodiments of this application provide an opening and closing mechanism and an electronic device, to implement that there is no gap between two bodies of the electronic device when the electronic device is opened and closed at 360° and when the electronic device is opened and closed at 180°.

According to a first aspect, an embodiment of this application provides an opening and closing mechanism, including a first rotating shaft and a second rotating shaft that are disposed in parallel, a first telescopic part disposed on the first rotating shaft, and a second telescopic part disposed on the second rotating shaft, where the first rotating shaft and the second rotating shaft are rotationally connected. The first rotating shaft and the second rotating shaft may be rotationally connected by using a chain, a hinge, a rope, a sleeve, and the like.

The first telescopic part includes a first connection part connected to the first rotating shaft and a first body fastening part that may slide along the first connection part, where the first body fastening part is configured to fasten a first body of an electronic device.

The second telescopic part includes a second connection part connected to the second rotating shaft and a second body fastening part that may slide along the second connection part, where the second body fastening part is configured to fasten a second body of the electronic device.

When an opening and closing angle between the first body fastening part and the second body fastening part is 0°, there is a gap between the first body fastening part and the first rotating shaft, and there is a gap between the second body fastening part and the second rotating shaft. In a process in which the opening and closing angle is changed from 0° to 180°, the first body fastening part slides toward the first rotating shaft, the second body fastening part slides toward the second rotating shaft. When the opening and closing angle is 180° and the first body and the second body are disposed side by side, there is no gap between the first body fastening part and the first rotating shaft, and there is no gap between the second body fastening part and the second rotating shaft. In this way, there is no gap or a small gap between the first body and the second body, and the rotating shaft is invisible on a display screen side.

In a process in which the opening and closing angle is changed from 180° to 360°, a distance between the first body fastening part and the first rotating shaft remains unchanged, and a distance between the second body fastening part and the second rotating shaft remains unchanged. In a process in which the first body and the second body flip outward, the rotating shaft is accommodated in a body of the electronic device. A person skilled in the art may understand that, in a process in which the opening and closing angle is changed from 180° to 0°, the display screen is closed inward, the first body fastening part slides away from the first rotating shaft, and the second body fastening part slides away from the second rotating shaft, to avoid interference between the first body and the second body when the opening and closing angle is 0°, avoid interference caused by the rotating shaft to the first body and the second body, and implement 360° opening and closing between the first body and the second body.

In one embodiment, the first telescopic part further includes a first sliding part that is slidingly connected to the first connection part, and the first sliding part may slide along the first connection part, to drive the first body fastening part to slide along the first connection part.

The second telescopic part further includes a second sliding part that is slidingly connected to the second connection part, and the second sliding part may slide along the second connection part, to drive the second body fastening part to slide along the second connection part.

In one embodiment, the first connection part includes a first interference part sleeved on the first rotating shaft and a first supporting part connected to the first interference part, and the first body fastening part may slide along the first supporting part.

The second connection part includes a second interference part sleeved on the second rotating shaft and a second supporting part connected to the second interference part, and the second body fastening part may slide along the second supporting part.

In a process in which the opening and closing angle is changed from 0° to 180°, the first interference part and the second interference part are in an interference state.

In a process in which the opening and closing angle is changed from 0° to 180°, the first interference part and the second interference part are in an interference state, so that the first rotating shaft and the second rotating shaft generate a torsion force, and if there is no external force, the first body and the second body may keep stable at any angle from 0° to 180°. This avoids relative rotation of the first rotating shaft and the second rotating shaft.

In one embodiment, a sliding shaft is disposed on an outer circumferential surface of the first rotating shaft, a sliding groove is disposed on the sliding shaft, and the first sliding part may slide around the sliding groove, so that the first sliding part slides along the first connection part, to drive the first body fastening part to slide along the first connection part.

In one embodiment, the sliding groove includes an inclined groove and a straight groove that are connected, and a sliding point is disposed on a first side surface of the first sliding part.

in a process in which the opening and closing angle is changed from 0° to 180°, the sliding point may slide in the inclined groove, so that the first sliding part slides along the first connection part. Specifically, because the inclined groove is inclined, when the sliding point slides in the inclined groove, the first sliding part slides on the first connection part along a direction parallel to the first rotating shaft.

In a process in which the opening and closing angle is changed from 180° to 360°, the sliding point may slide in the straight groove, so that the first sliding part and the first connection part are relatively stationary. When the sliding point slides in the straight groove, no displacement occurs along the direction parallel to the first rotating shaft. Therefore, no displacement change occurs between the first sliding part and the first connection part.

In one embodiment, a groove is disposed on a second side surface of the first sliding part, the groove may slide along the first connection part, and the second side surface is disposed opposite to the first side surface. The groove is disposed, so that the first sliding part and the first connection part form a clamping function. This makes the sliding smooth, and avoids that the first sliding part is deviated or detached from the first connection part.

In one embodiment, an inclined body is disposed on a surface of the first sliding part, and a sliding opening matching the inclined body is disposed on the first body fastening part.

In a process in which the opening and closing angle is changed from 0° to 180°, the sliding opening may slide along the inclined body.

In a process in which the opening and closing angle is changed from 180° to 360°, the sliding opening and the inclined body are relatively stationary.

In one embodiment, the first telescopic part further includes an elastic component and a position-limiting part.

The position-limiting part is disposed at an end that is of the first connection part and that is away from the first rotating shaft.

One end of the elastic component presses against the first body fastening part, and the other end of the elastic component presses against the position-limiting part.

The elastic component is configured to pull the first body fastening part back from a position away from the first rotating shaft to a position close to the first rotating shaft.

In one embodiment, a position-limiting step is disposed on a side surface of the position-limiting part, and when the opening and closing angle is 0°, a part of the first body fastening part presses against the position-limiting step. When the first body fastening part slides away from the first rotating shaft, the position-limiting step may limit the first body fastening part. When the first body fastening part presses against the position-limiting step, the first body fastening part stops sliding.

In one embodiment, the first interference part is a C-shaped interference part.

When the opening and closing angle is 0° to 180°, the first interference part interferes with the second interference part.

In one embodiment, the first body fastening part is a housing structure, and the first body fastening part is sleeved outside the first connection part.

In one embodiment, the mechanism further includes a joint part.

A part of the first rotating shaft is rotationally disposed in the joint part, and a part of the second rotating shaft is rotationally disposed in the joint part.

In one embodiment, the mechanism further includes a joint part.

A part of the first rotating shaft is rotationally disposed in the joint part, and a part of the second rotating shaft is rotationally disposed in the joint part.

In one embodiment, a sharp convex part is disposed at an end that is of the first sliding part and that is close to the joint part.

When the opening and closing angle is 180°, a first surface of the sharp convex part and a surface of the joint part are located in a same plane, and a second surface of the sharp convex part is fitted to the joint part.

In a process in which the opening and closing angle is changed from 0° to 180°, the sharp convex part interferes with the surface of the joint part, so that the first body fastening part is disposed away from the first rotating shaft.

In one embodiment, a third interference part is disposed on one side of the joint part.

In a process in which the opening and closing angle is changed from 0° to 180°, the first interference part interferes with the third interference part.

In one embodiment, the first telescopic part further includes a chain part.

The chain part is configured to connect the first body fastening part, the first connection part, and the first sliding part, and drive the first body fastening part to slide when the first sliding part slides along the first connection part.

In one embodiment, the first body fastening part is an open box structure, and the first connection part is slidingly disposed in the first body fastening part.

In one embodiment, the joint part includes a first rotating hole and a second rotating hole, the part of the first rotating shaft is located in the first rotating hole, and the part of the second rotating shaft is located in the second rotating hole, and a diameter of the first rotating hole is greater than a diameter of the first rotating shaft, and a diameter of the second rotating hole is greater than a diameter of the second rotating shaft.

In one embodiment, a structure of the first rotating shaft is the same as a structure of the second rotating shaft, and a structure of the first telescopic part is the same as a structure of the second telescopic part.

According to a second aspect, an embodiment of this application provides an electronic device, including a first body, a second body, and the opening and closing mechanism described in the first aspect and the possible designs of the first aspect.

The first body is connected to the first body fastening part.

The second body is connected to the second body fastening part.

In one embodiment, the electronic device is a notebook computer, the first body is a first display screen, and the second body is a second display screen.

According to the opening and closing mechanism and the electronic device provided in this embodiment, the opening and closing mechanism includes: the first rotating shaft and the second rotating shaft that are disposed in parallel, the first telescopic part disposed on the first rotating shaft and the second telescopic part disposed on the second rotating shaft, and the first rotating shaft and the second rotating shaft are rotationally connected. The first telescopic part includes the first connection part connected to the first rotating shaft and the first body fastening part that may slide along the first connection part, and the first body fastening part is configured to fasten the first body. The second telescopic part includes the second connection part connected to the second rotating shaft and the second body fastening part that may slide along the second connection part, and the second body fastening part is configured to fasten the second body. In a process in which the opening and closing angle is changed from 0° to 180°, the first body fastening part slides toward the first rotating shaft, and the second body fastening part slides toward the second rotating shaft. When the opening and closing angle is 180°, there is no gap or a small gap between the first body and the second body, the rotating shaft is invisible on the display screen side, and the two display screens are one display screen in a visual effect. This improves user experience. When the opening and closing angle is changed from 180° to 360°, the distance between the first body fastening part and the first rotating shaft remains unchanged, and the distance between the second body fastening part and the second rotating shaft remains unchanged. In a process in which the first body and the second body are flipped outward, the rotating shaft is accommodated in a body of the electronic device. When the opening and closing angle is changed from 180° to 0°, the first body fastening part slides away from the first rotating shaft, and the second body fastening part slides away from the second rotating shaft, to avoid interference between the first body and the second body, avoid interference caused by the rotating shaft to the first body and the second body, and implement 360° opening and closing between the first body and the second body.

DESCRIPTION OF EMBODIMENTS

Figure 1:
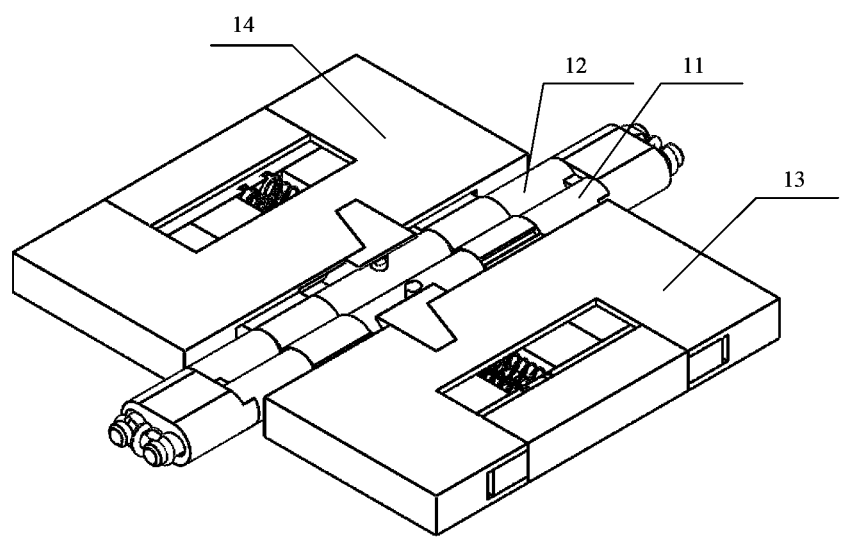
FIG. 1 is a schematic diagram of an entire mechanism of an opening and closing mechanism according to one embodiment.

In view of a prior art problem that two display screens of a notebook computer cannot meet 360° opening and closing and there is a large gap between the two display screens that are disposed side by side, embodiments of this application provides an opening and closing mechanism. The opening and closing mechanism may fasten two bodies of an electronic device. In this way, the two bodies of the electronic device can be opened and closed at 360°, and when an opening and closing angle between the two bodies is 180°, it is ensured that there is no gap between the two bodies or the gap is small enough.

The opening and closing mechanism includes a first rotating shaft and a second rotating shaft that are disposed in parallel, a first telescopic part disposed on the first rotating shaft, and a second telescopic part disposed on the second rotating shaft. The first rotating shaft and the second rotating shaft are rotationally connected. For example, the first rotating shaft and the second rotating shaft may be rotationally connected by using a chain, a hinge, a rope, a sleeve, or the like. Any implementation in which the first rotating shaft and the second rotating shaft can be rotationally connected may be applied to the embodiments of this application.

The first telescopic part includes a first connection part connected to the first rotating shaft and a first body fastening part that may slide along the first connection part, and the first body fastening part is configured to fasten a first body of the electronic device. The first body fastening part may fasten the first body in a manner such as adhesive bonding, fastening, or threaded connection. A specific fastening manner is not specially limited in this embodiment.

The second telescopic part includes a second connection part connected to the second rotating shaft and a second body fastening part that may slide along the second connection part, and the second body fastening part is configured to fasten a second body of the electronic device. The second body fastening part may fasten the second body in a manner such as adhesive bonding, fastening, or threaded connection. A specific fastening manner is not specially limited in this embodiment.

In this embodiment, the electronic device may be any device having a flipping function, for example, a notebook computer, a flip phone, or a navigator. As long as the electronic device has the first body and the second body that can be flipped, the electronic device falls within the protection scope of the embodiments of this application. The flipping in this embodiment means that the first body and the second body may be closed at 0°, or may be opened at various angles, for example, 90°, 180°, 270°, and 360°.

A person skilled in the art may understand that an angle between the first body and the second body may be equal to an angle between the first body fastening part and the second body fastening part, or may be equal to a difference between 360° and an angle between the first body fastening part and the second body fastening part. For example, the first body fastening part and the second body fastening part are used as a reference. When the angle between the first body fastening part and the second body fastening part is 0°, the first body and the second body may be disposed face to face, and the angle between the first body and the second body is 0°. Alternatively, the first body and the second body may be disposed back to back, and the angle between the first body and the second body is 360°.

In this embodiment, an example in which the electronic device is a notebook computer, the first body is a first display screen, and the second body is a second display screen is used for description. An example in which an angle between the first display screen and the second display screen is equal to the angle between the first body fastening part and the second body fastening part is used for description.

In one embodiment, when an opening and closing angle between the first body fastening part and the second body fastening part is 0°, there is a gap between the first body fastening part and the first rotating shaft, and there is a gap between the second body fastening part and the second rotating shaft. In a process in which the opening and closing angle is changed from 0° to 180°, the first body fastening part slides toward the first rotating shaft, the second body fastening part slides toward the second rotating shaft. When the opening and closing angle is 180° and the first display screen and the second display screen are disposed side by side, there is no gap between the first body fastening part and the first rotating shaft, and there is no gap between the second body fastening part and the second rotating shaft. In this way, there is no gap or a small gap between the first display screen and the second display screen, and the rotating shaft is invisible on a display screen side.

In a process in which the opening and closing angle is changed from 180° to 360°, a distance between the first body fastening part and the first rotating shaft remains unchanged, and a distance between the second body fastening part and the second rotating shaft remains unchanged. In a process in which the first display screen and the second display screen flip outward, the rotating shaft is accommodated in a body of the notebook computer. A person skilled in the art may understand that, in a process in which the opening and closing angle is changed from 180° to 0°, the display screen is closed inward, the first body fastening part slides away from the first rotating shaft, and the second body fastening part slides away from the second rotating shaft, to avoid interference between the first display screen and the second display screen when the opening and closing angle is 0°, avoid interference caused by the rotating shaft to the first display screen and the second display screen, and implement 360° opening and closing between the first display screen and the second display screen.

The first body fastening part may slide along the first connection part by itself, or may be driven by another component to slide along the first connection part. Similarly, the second body fastening part may slide along the second connection part by itself, or may be driven by another component to slide along the second connection part. A specific sliding manner is not particularly limited in this embodiment.

In one embodiment, the first telescopic part further includes a first sliding part that is slidingly connected to the first connection part, and the first sliding part may slide along the first connection part, to drive the first body fastening part to slide along the first connection part.

The second telescopic part further includes a second sliding part that is slidingly connected to the second connection part, and the second sliding part may slide along the second connection part, to drive the second body fastening part to slide along the second connection part.

In one embodiment, the first body fastening part may slide by using the first sliding part. The first sliding part may be slidingly connected to the first connection part, and the first sliding part may slide horizontally, vertically, obliquely, or the like along the first connection part. A sliding direction of the first sliding part is not specially limited in this embodiment, provided that the first sliding part can drive the first body fastening part to slide along the first connection part, to implement that the first body fastening part is away from or close to the first rotating shaft.

Similarly, the second body fastening part may slide by using the second sliding part. The second sliding part may be slidingly connected to the second connection part, and the second sliding part may slide horizontally, vertically, obliquely, or the like along the second connection part. A sliding direction of the second sliding part is not specially limited in this embodiment, provided that the second sliding part can drive the second body fastening part to slide along the second connection part, to implement that the second body fastening part is away from or close to the second rotating shaft.

In one embodiment, the first connection part provided in this embodiment includes a first interference part sleeved on the first rotating shaft and a first supporting part connected to the first interference part, and the first body fastening part may slide along the first supporting part.

The second connection part includes a second interference part sleeved on the second rotating shaft and a second supporting part connected to the second interference part, and the first body fastening part may slide along the second supporting part.

In a process in which the opening and closing angle is changed from 0° to 180°, the first interference part and the second interference part are in an interference state, so that the first rotating shaft and the second rotating shaft generate a torsion force, and if there is no external force, the first display screen and the second display screen may keep stable at any angle from 0° to 180°. This avoids relative rotation of the first rotating shaft and the second rotating shaft.

The opening and closing mechanism provided in this embodiment includes: the first rotating shaft and the second rotating shaft that are disposed in parallel, the first telescopic part disposed on the first rotating shaft and the second telescopic part disposed on the second rotating shaft, and the first rotating shaft and the second rotating shaft are rotationally connected. The first telescopic part includes the first connection part connected to the first rotating shaft and the first body fastening part that may slide along the first connection part, and the first body fastening part is configured to fasten the first display screen. The second telescopic part includes the second connection part connected to the second rotating shaft and the second body fastening part that may slide along the second connection part, and the second body fastening part is configured to fasten the second display screen. In a process in which the opening and closing angle is changed from 0° to 180°, the first body fastening part slides toward the first rotating shaft, and the second body fastening part slides toward the second rotating shaft. When the opening and closing angle is 180°, there is no gap or a small gap between the first display screen and the second display screen, the rotating shaft is invisible on the display screen side, and the two display screens are one display screen in a visual effect. This improves user experience. When the opening and closing angle is changed from 180° to 360°, the distance between the first body fastening part and the first rotating shaft remains unchanged, and the distance between the second body fastening part and the second rotating shaft remains unchanged. In a process in which the first display screen and the second display screen are flipped outward, the rotating shaft is accommodated in a body of the electronic device. When the opening and closing angle is changed from 180° to 0°, the first body fastening part slides away from the first rotating shaft, and the second body fastening part slides away from the second rotating shaft, to avoid interference between the first display screen and the second display screen, avoid interference caused by the rotating shaft to the first display screen and the second display screen, and implement 360° opening and closing between the first display screen and the second display screen.

A person skilled in the art may understand that the opening and closing mechanism may be implemented by using a plurality of structures. For ease of description, two specific examples are given in this embodiment for detailed description. Other structures that may be implemented by using the principles of this embodiment all fall within the protection scope of this application. Details are not described herein again in this embodiment.

Embodiment 1

Figure 2:
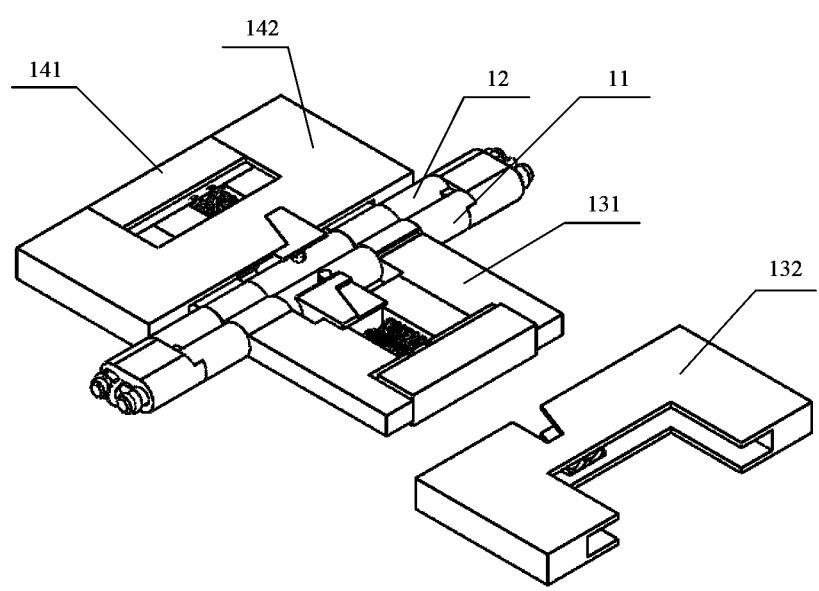
FIG. 2 is a schematic exploded diagram 1 of an opening and closing mechanism according to one embodiment.
Figure 3:
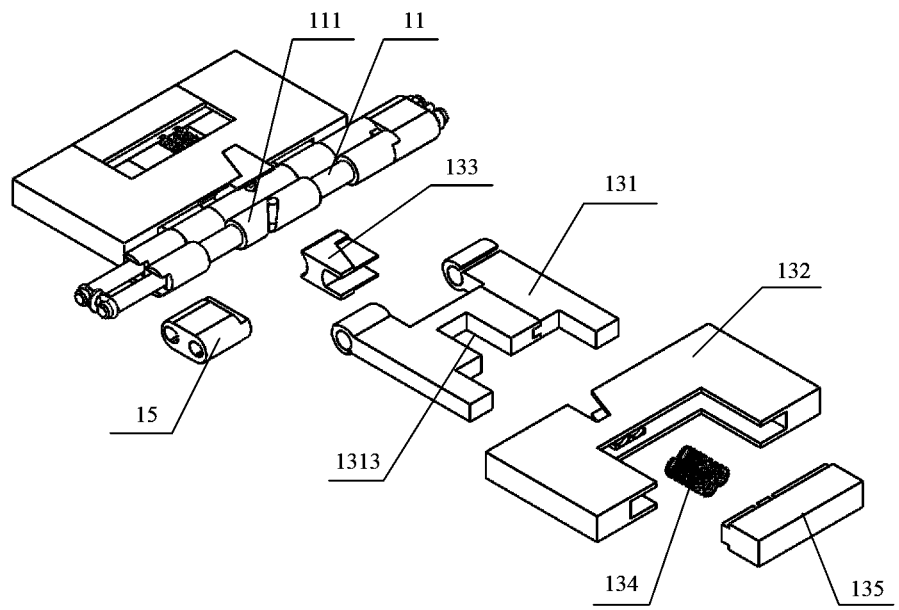
FIG. 3 is a schematic exploded diagram 2 of an opening and closing mechanism according to one embodiment.

FIG. 1 is a schematic diagram of an entire mechanism of an opening and closing mechanism according to one embodiment. FIG. 2 is a schematic exploded diagram 1 of an opening and closing mechanism according to one embodiment, and FIG. 3 is a schematic exploded diagram 2 of an opening and closing mechanism according to one embodiment.

In this embodiment, a specific schematic diagram of the opening and closing structure is described by using an example in which an opening and closing angle is 180°. As shown in FIG. 1, the opening and closing mechanism includes a first rotating shaft 11 and a second rotating shaft 12 that are disposed in parallel, a first telescopic part 13 disposed on the first rotating shaft 11, and a second telescopic part 14 disposed on the second rotating shaft 12. The first rotating shaft 11 and the second rotating shaft 12 are rotationally connected.

As shown in FIG. 2, the first telescopic part 13 includes a first connection part 131 connected to the first rotating shaft 11 and a first body fastening part 132 that may slide along the first connection part 131, and the first body fastening part 132 is configured to fasten a first display screen.

The second telescopic part 14 includes a second connection part 141 connected to the second rotating shaft 12 and a second body fastening part 142 that may slide along the second connection part 141, and the second body fastening part 142 is configured to fasten a second display screen.

In one embodiment, the first body fastening part 132 is a housing structure, the first body fastening part 132 is sleeved outside the first connection part 131, the first body fastening part 142 is a housing structure, and the first body fastening part 142 is sleeved outside the second connection part 141.

In a process in which the opening and closing angle is changed from 0° to 180°, the first body fastening part 132 slides toward the first rotating shaft 11, and the second body fastening part 142 slides toward the second rotating shaft 12. In a process in which the opening and closing angle is changed from 180° to 360°, a distance between the first body fastening part 132 and the first rotating shaft 11 remains unchanged, a distance between the second body fastening part 142 and the second rotating shaft 12 remains unchanged, and the opening and closing angle is an angle between the first body fastening part 132 and the second body fastening part 142.

As shown in FIG. 3, the first telescopic part 13 further includes a first sliding part 133 that is slidingly connected to the first connection part 131, the first sliding part 133 may slide along the first connection part 131, to drive the first body fastening part 132 to slide along the first connection part 131.

A structure of the second telescopic part 14 is the same as a structure of the first telescopic part 13. Details are not described herein again in this embodiment.

In this embodiment, a structure of the first rotating shaft is the same as a structure of the second rotating shaft, and the structure of the first telescopic part is the same as the structure of the second telescopic part. Therefore, this embodiment is described by using the first rotating shaft and the first telescopic part as an example, and structures of the second rotating shaft and the second telescopic part are not described in detail again.

Figure 4:
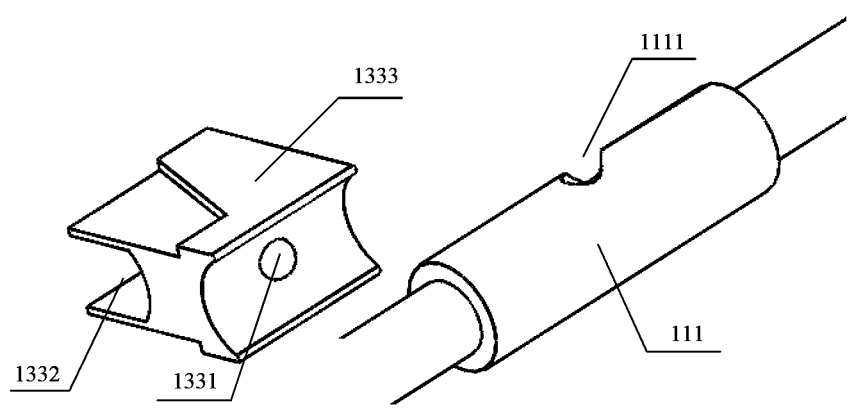
FIG. 4 is a schematic diagram of a sliding structure according to one embodiment.
Figure 5:
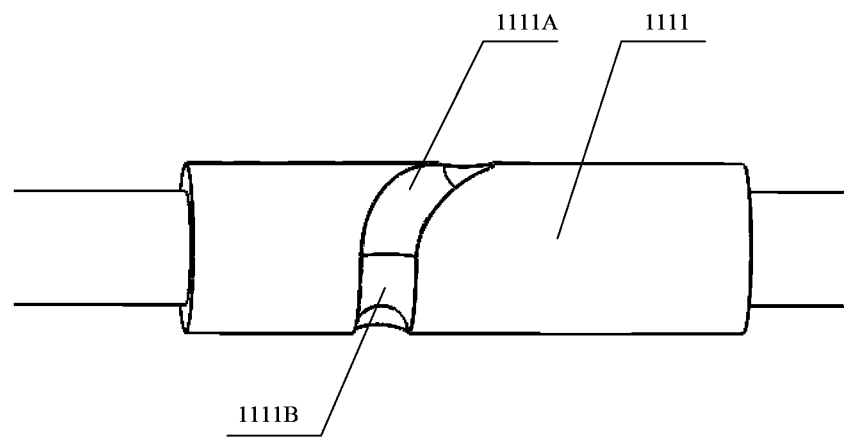
FIG. 5 is a schematic structural diagram of a sliding shaft according to one embodiment.
Figures 6A, 6B, 6C:
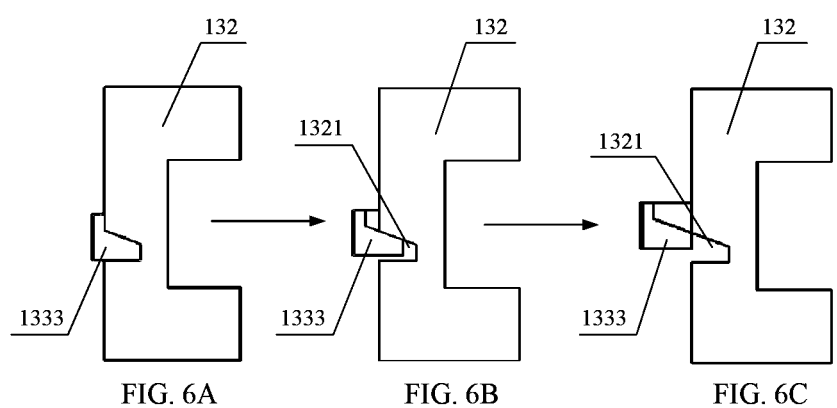
FIG. 6A, FIG. 6B and FIG. 6C are schematic sliding diagrams of a body fastening part according to one embodiment.
Figure 7:
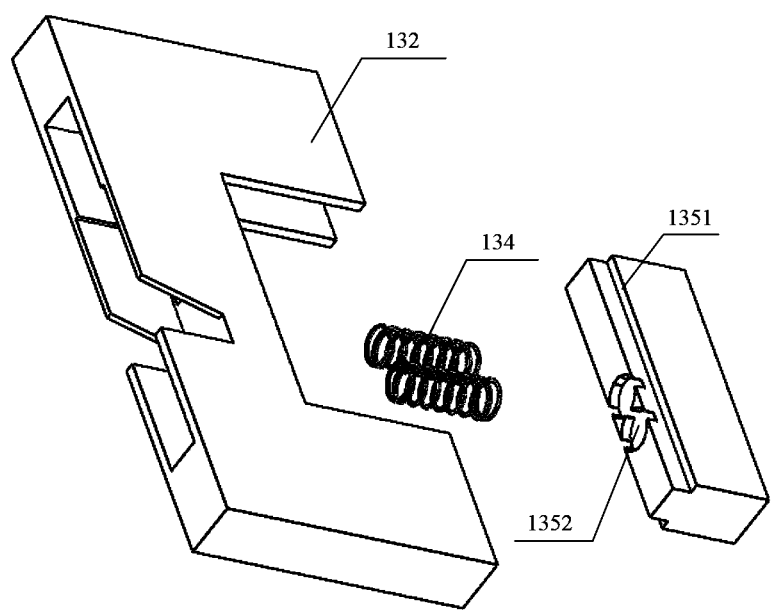
FIG. 7 is a schematic diagram of an elastic structure according to one embodiment.
Figure 8:
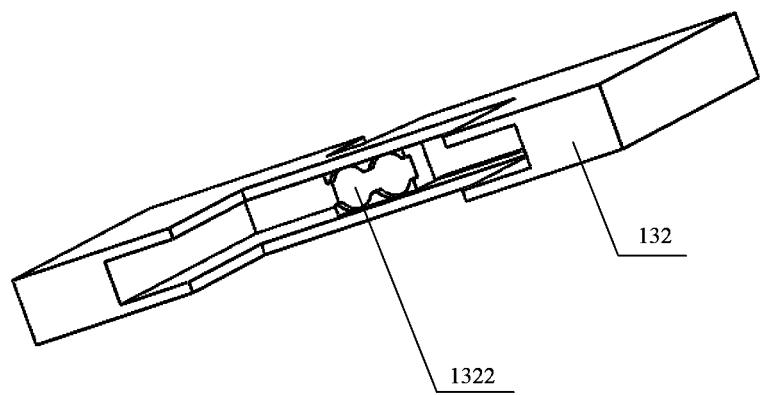
FIG. 8 is a schematic structural diagram of a body fastening part according to one embodiment.

With reference to FIG. 3 to FIG. 8, the following describes in detail a structure corresponding to sliding of the first sliding part along the first connection part 131 in Embodiment 1. FIG. 4 is a schematic diagram of a sliding structure according to one embodiment. FIG. 5 is a schematic structural diagram of a sliding shaft according to one embodiment. FIG. 6A, FIG. 6B and FIG. 6C are schematic sliding diagrams of a body fastening part according to one embodiment. FIG. 7 is a schematic diagram of an elastic structure according to one embodiment. FIG. 8 is a schematic structural diagram of a body fastening part according to one embodiment.

As shown in FIG. 3 to FIG. 5, a sliding shaft 111 is disposed on an outer circumferential surface of the first rotating shaft 11, a sliding groove 1111 is disposed on the sliding shaft 111, and the first sliding part 133 may slide around the sliding groove 1111, so that the first sliding part 133 slides along the first connection part 131, to drive the first body fastening part 132 to slide along the first connection part 131.

In one embodiment, as shown in FIG. 4 and FIG. 5, the sliding groove 1111 includes an inclined groove 1111A and a straight groove 1111B that are connected, and a sliding point 1331 is disposed on a first side surface of the first sliding part 133.

The sliding point 1331 is disposed on the first side surface, the first side surface may be an arc-shaped surface matching the first rotating shaft 11, and the sliding point 1331 protrudes from the first side surface. In this way, when the first side surface is fitted to the outer circumferential surface of the first rotating shaft 11, the sliding point 1331 may be located in the sliding groove 1111. The sliding point 1331 may be a protrusion of various shapes, for example, may be a spherical protrusion, a hemispherical protrusion, or a spherical cap protrusion. A shape of the sliding point 1331 is not particularly limited in this embodiment.

In a process in which the opening and closing angle is changed from 0° to 180°, the sliding point 1331 may slide in the inclined groove 1111A, so that the first sliding part 133 slides along the first connection part 131. Specifically, because the inclined groove 1111A is inclined, when the sliding point 1331 slides in the inclined groove 1111A, the first sliding part 133 slides on the first connection part 131 along a direction parallel to the first rotating shaft 11.

In a process in which the opening and closing angle is changed from 180° to 360°, the sliding point 1331 may slide in the straight groove 1111B, so that the first sliding part 133 and the first connection part 131 are relatively stationary. Specifically, when the sliding point 1331 slides in the straight groove 1111B, no displacement occurs along the direction parallel to the first rotating shaft 11. Therefore, no displacement change occurs between the first sliding part 133 and the first connection part 131.

In one embodiment, a groove 1332 is disposed on a second side surface of the first sliding part 133. The second side surface is disposed opposite to the first side surface. A part of the first connection part 131 is located in the groove 1332, the groove 1332 may be clamped outside the first connection part 131, and the groove 1332 may slide along the first connection part 131. The groove 1332 is disposed, so that the first sliding part 133 and the first connection part 131 form a clamping function. This makes the sliding smooth, and avoids that the first sliding part is deviated or detached from the first connection part.

As shown in FIG. 3, FIG. 6A, FIG. 6B and FIG. 6C, an inclined body 1333 is disposed on a surface of the first sliding part 133, and a sliding opening 1321 matching the inclined body 1333 is disposed on the first body fastening part 132. In a process in which the opening and closing angle is changed from 0° to 180°, the sliding opening 1321 may slide along the inclined body 1333. In a process in which the opening and closing angle is changed from 180° to 360°, the sliding opening 1321 and the inclined body 1333 are relatively stationary.

Specifically, when the opening and closing angle is 180°, a relative position between the first sliding part 133 and the first body fastening part 132 may be shown in FIG. 6A. In a process in which the opening and closing angle is changed from 180° to 360°, the sliding opening 1321 and the inclined body 1333 are relatively stationary, in other words, they keep in a state shown in FIG. 6A. In a process in which the opening and closing angle is changed from 180° to 0°, the sliding point 1331 slides in the inclined groove 1111A. Because the first sliding part 133 moves along the direction parallel to the first rotating shaft 11, and the first body fastening part 132 does not move along the direction parallel to the first rotating shaft 11 because of a fastening function of the first connection part 131, in a process of moving the first sliding part 133, under a sliding squeezing effect of the first sliding part 133, the sliding opening 1321 may slide along the inclined body 1333, to drive the first body fastening part 132 to slide away from the first rotating shaft 11, and a sliding direction is perpendicular to the first rotating shaft 11. A sliding process of the first body fastening part 132 is successively shown in FIG. 6A, FIG. 6B, and FIG. 6C.

In this embodiment, in a process in which the opening and closing angle is changed from 180° to 0°, the first body fastening part 132 slides away from the first rotating shaft 11. In a process in which the opening and closing angle is changed from 0° to 180°, the first body fastening part 132 slides toward the first rotating shaft 11 and is reset. In this embodiment, the first body fastening part 132 may be reset by using an elastic component. The following provides detailed description with reference to FIG. 2, FIG. 3, FIG. 7, and FIG. 8.

Specifically, as shown in FIG. 2, FIG. 3, FIG. 7, and FIG. 8, the first telescopic part 13 further includes an elastic component 134 and a position-limiting part 135. The position-limiting part 135 is disposed at one end that is of the first connection part 131 and that is away from the first rotating shaft 11. The position-limiting part 135 may be integrated with the first connection part 131 as a whole, or may be fastened to the first connection part 131 by bonding, welding, clamping, threaded connection, or the like. In other words, positions of the position-limiting part 135 and the first connection part 131 do not change. The elastic component 134 may be a spring, elastic silicone, an elastic structure, or the like. A specific implementation structure of the elastic component 134 is not particularly limited in this embodiment.

An accommodation part 1313 is disposed on the first connection part 131, the elastic component may be disposed in the accommodation part 1313, one end of the elastic component 134 presses against the first body fastening part 132, and the other end of the elastic component 134 presses against the position-limiting part 135. A person skilled in the art may understand that the elastic component 134 may also be connected to the first body fastening part 132 and the position-limiting part 135. An implementation of disposing the elastic component 134 between the first body fastening part 132 and the position-limiting part 135 is not specially limited in this embodiment, provided that the elastic component 134 can be fastened between the first body fastening part 132 and the position-limiting part 135 and can be extended and contracted.

As shown in FIG. 7, a first circular groove 1352 is disposed on the position-limiting part 135, and one end of the elastic component 134 may be disposed in the first circular groove 1352. As shown in FIG. 8, a second circular groove 1322 is disposed on the first body fastening part 132, and the other end of the elastic component 134 may be disposed in the second circular groove 1322. The elastic component 134 may be fastened by disposing the first circular groove 1352 and the second circular groove 1322, to prevent the elastic component 134 from being detached in an extension and contraction process.

In a process in which the opening and closing angle is changed from 180° to 0°, the first body fastening part 132 slides away from the first rotating shaft 11. Because a position of the position-limiting part 135 remains unchanged, the elastic component 134 is squeezed, and a length of the elastic component 134 is shortened. In a process in which the opening and closing angle is changed from 0° to 180°, the squeezed elastic component 134 performs a reset operation, to pull the first body fastening part 132 back from a position away from the first rotating shaft 11 to a position close to the first rotating shaft 11.

In one embodiment, as shown in FIG. 7, a position-limiting step 1351 is disposed on a side surface of the position-limiting part 135. When the opening and closing angle is 0°, a part of the first body fastening part 132 presses against the position-limiting step 1351. Specifically, when the first body fastening part 132 slides away from the first rotating shaft 11, the position-limiting step 1351 may limit the first body fastening part 132. When the first body fastening part 132 presses against the position-limiting step 1351, the first body fastening part 132 stops sliding.

Figure 9:
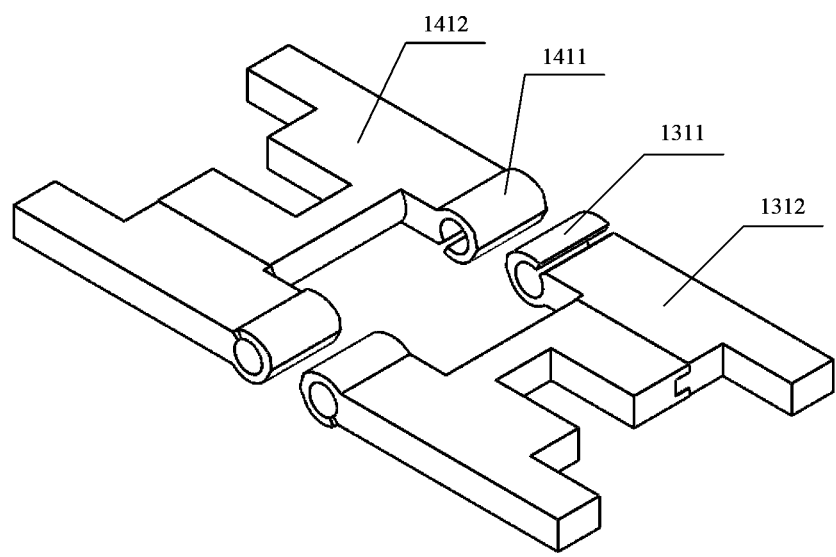
FIG. 9 is a schematic diagram of an interference structure according to one embodiment.
Figure 10:
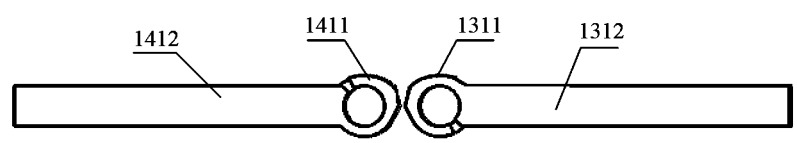
FIG. 10 is a front view of an interference structure according to one embodiment.

The following describes in detail, with reference to FIG. 3, FIG. 9, and FIG. 10, a structure in which the opening and closing mechanism generates a torsion force according to Embodiment 1 of this application. FIG. 9 is a schematic diagram of an interference structure according to Embodiment 1 of this application. FIG. 10 is a front view of an interference structure according to Embodiment 1 of this application.

As shown in FIG. 9 and FIG. 10, the first connection part 131 includes a first interference part 1311 sleeved on the first rotating shaft 11 and a first supporting part 1312 connected to the first interference part 1311, and the first body fastening part 132 may slide along the first supporting part 1312. The second connection part 141 includes a second interference part 1411 sleeved on the second rotating shaft 12 and a second supporting part 1412 connected to the second interference part 1411, and the first body fastening part 132 may slide along the second supporting part 1412. In a process in which the opening and closing angle is changed from 0° to 180°, the first interference part 1311 and the second interference part 1411 are in an interference state.

In one embodiment, an interference effect between the first interference part 1311 and the second interference part 1411 causes a torsion force effect between the first rotating shaft and the second rotating shaft. In a possible implementation, as shown in FIG. 9, the first interference part 1311 is a C-shaped interference part. The C-shaped interference part has an opening. When two interference parts interfere with each other, problems such as deformation and breakage caused by excessive squeeze of the interference part are avoided because of the existence of the opening.

When the opening and closing angle is 180°, structures of the first interference part 1311 and the second interference part 1411 are shown in FIG. 10. An upper part of the first interference part 1311 and an upper part of the second interference part 1411 have protruding parts. In a process in which the opening and closing angle is changed from 180° to 360°, the first interference part 1311 and the second interference part 1411 are fitted. In a process in which the opening angle is changed from 180° to 0°, the first interference part 1311 interferes with the second interference part 1411, so that the first rotating shaft and the second rotating shaft generate the torsion force. When there is no other external force, the opening and closing angle between the first display screen and the second display screen may remain unchanged.

As shown in FIG. 3, the opening and closing mechanism further includes a joint part 15, a part of the first rotating shaft 11 is rotationally disposed in the joint part 15, and a part of the second rotating shaft 12 is rotationally disposed in the joint part 15.

In one embodiment, the joint part 15 includes a first rotating hole 151 and a second rotating hole 152. The part of the first rotating shaft 11 is located in the first rotating hole 151, and the part of the second rotating shaft 12 is located in the second rotating hole 152. A diameter of the first rotating hole 151 is greater than a diameter of the first rotating shaft 11, and a diameter of the second rotating hole 152 is greater than a diameter of the second rotating shaft 12.

A person skilled in the art may understand that because the first interference part 1311 and the second interference part 1411 exist, a distance between an axis of the first rotating shaft 11 and an axis of the second rotating shaft 12 changes. When the opening and closing angle is 180°, the distance between two axes is a first distance, and when the opening and closing angle is 0°, the distance between the two axes is a second distance. Because no interference exists when the opening and closing angle is 180°, and the interference exists when the opening and closing angle is 0°, the first distance is less than the second distance. The diameter of the first rotating hole 151 is greater than the diameter of the first rotating shaft 11, and the diameter of the second rotating hole 152 is greater than the diameter of the second rotating shaft 12, which provides distance space for the foregoing distance change, and ensures generation of an interference process.

The following describes in detail, with reference to FIG. 11 to FIG. 15, forms of the opening and closing mechanism provided in Embodiment 1 of this application from different angles.

Figure 11A:
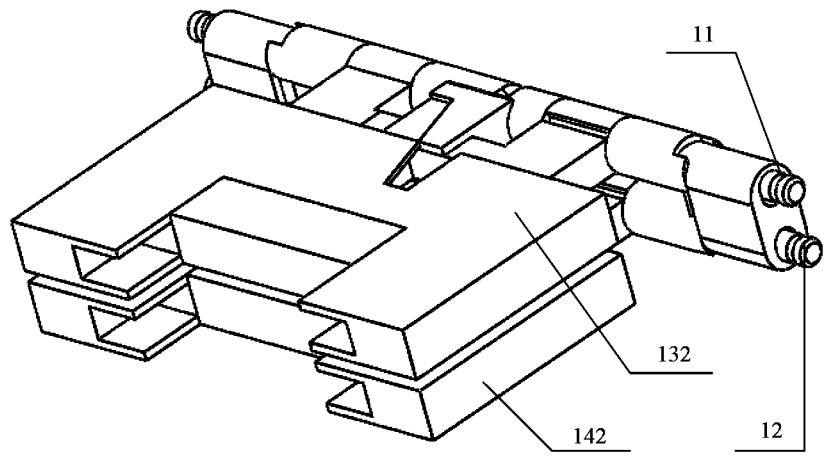
FIG. 11A is a three-dimensional view when an opening and closing angle is 0° according to one embodiment.
Figure 11B:
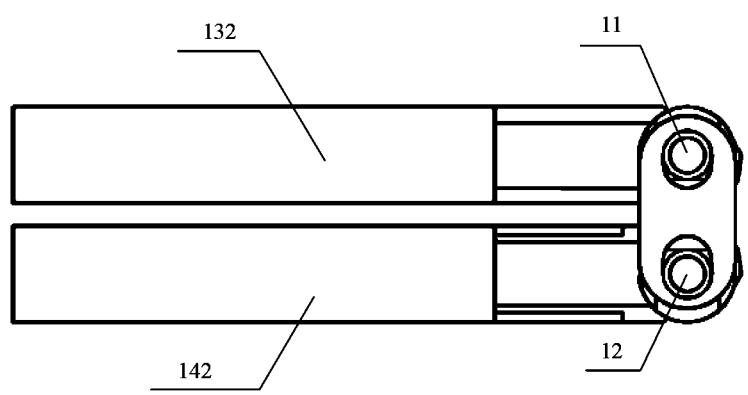
FIG. 11B is a side view when an opening and closing angle is 0° according to one embodiment.

FIG. 11A is a three-dimensional view when an opening and closing angle is 0° according to one embodiment. FIG. 11B is a side view when an opening and closing angle is 0° according to one embodiment. As shown in FIG. 11A, the first body fastening part 132 is disposed away from the first rotating shaft 11, and the second body fastening part 142 is disposed away from the second rotating shaft 12. Because of interference between the first interference part and the second interference part, the distance between the axis of the first rotating shaft 11 and the axis of the second rotating shaft 12 is the longest.

Figure 12A:
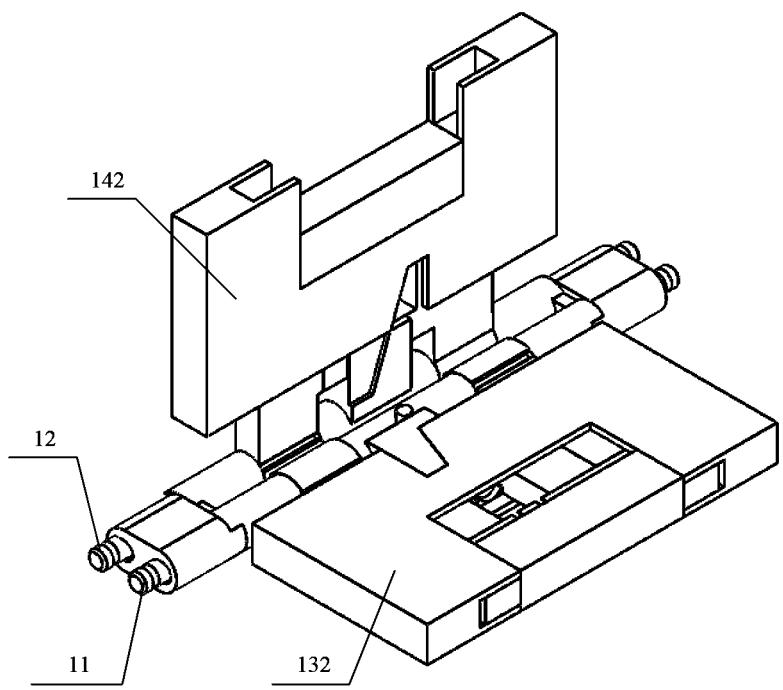
FIG. 12A is a three-dimensional view when an opening and closing angle is 90° according to one embodiment.
Figure 12B:
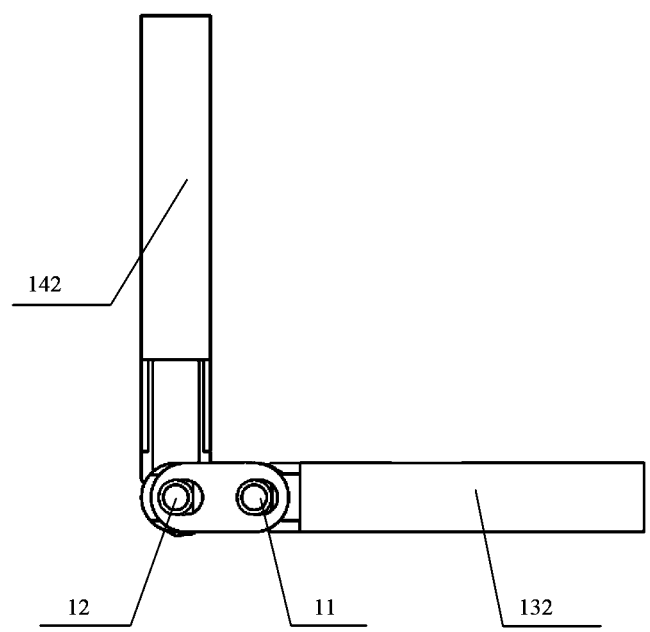
FIG. 12B is a side view when an opening and closing angle is 90° according to one embodiment.

FIG. 12A is a three-dimensional view when an opening and closing angle is 90° according to one embodiment. FIG. 12B is a side view when an opening and closing angle is 90° according to one embodiment. As shown in FIG. 12A, the first body fastening part 132 is disposed near the first rotating shaft 11, and the second body fastening part 142 is disposed away from the second rotating shaft 12. As shown in FIG. 12B, the distance between the axis of the first rotating shaft 11 and the axis of the second rotating shaft 12 is smaller than that in FIG. 11B.

Figure 13A:
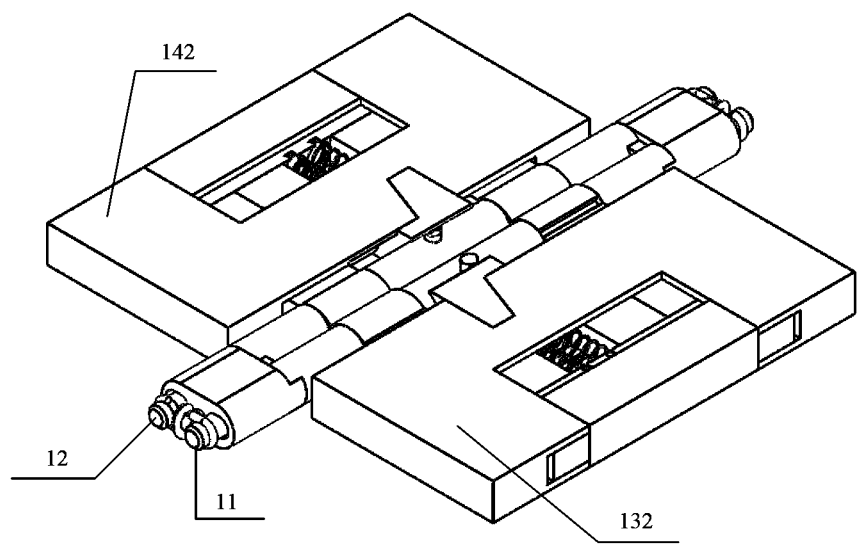
FIG. 13A is a three-dimensional view when an opening and closing angle is 180° according to one embodiment.
Figure 13B:
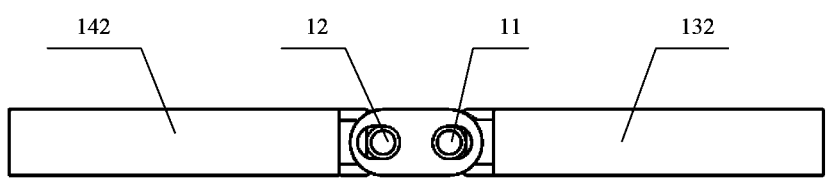
FIG. 13B is a side view when an opening and closing angle is 180° according to one embodiment.

FIG. 13A is a three-dimensional view when an opening and closing angle is 180° according to one embodiment. FIG. 13B is a side view when an opening and closing angle is 180° according to one embodiment. As shown in FIG. 13A, the first body fastening part 132 is disposed near the first rotating shaft 11, and the second body fastening part 142 is disposed near the second rotating shaft 12. As shown in FIG. 13B, no interference is generated between the first interference part and the second interference part, the distance between the axis of the first rotating shaft 11 and the axis of the second rotating shaft 12 is smaller than that in FIG. 12B, and the distance between the axis of the first rotating shaft 11 and the axis of the second rotating shaft 12 is the smallest.

Figure 14A:
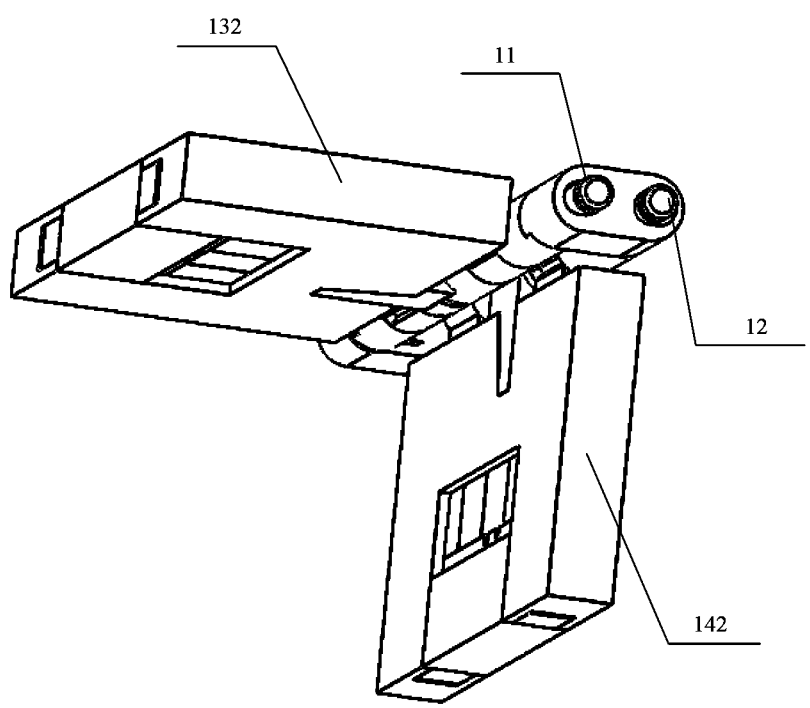
FIG. 14A is a three-dimensional view when an opening and closing angle is 270° according to one embodiment.
Figure 14B:
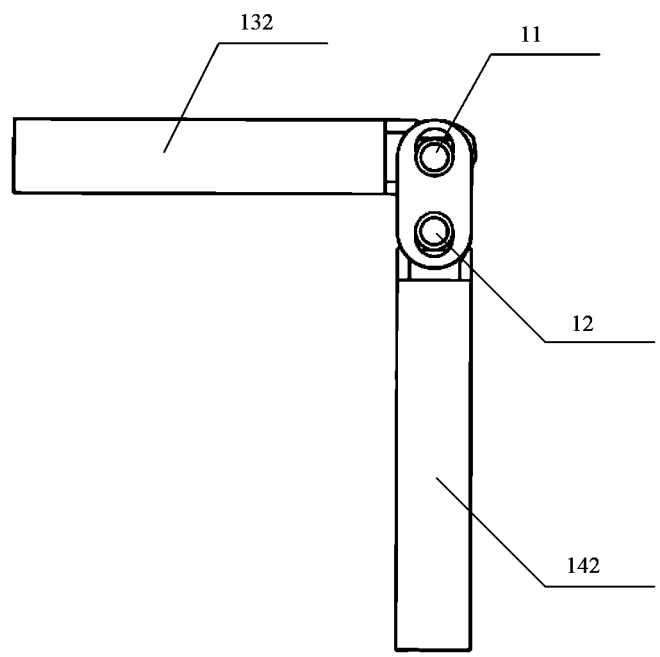
FIG. 14B is a side view when an opening and closing angle is 270° according to one embodiment.
Figure 15A:
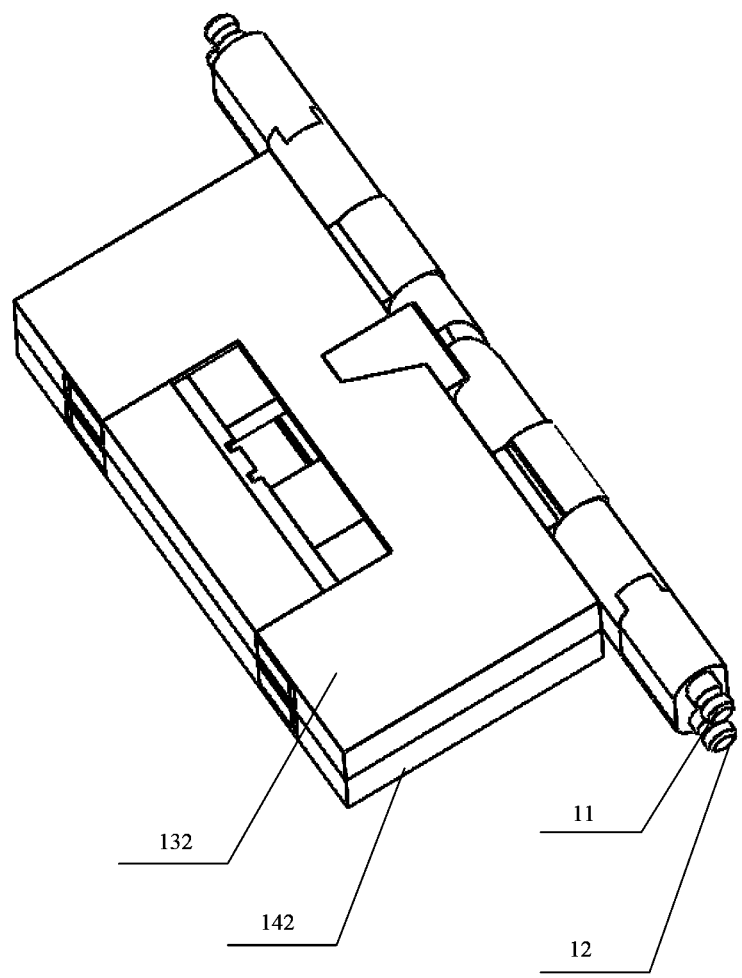
FIG. 15A is a three-dimensional view when an opening and closing angle is 360° according to one embodiment.
Figure 15B:
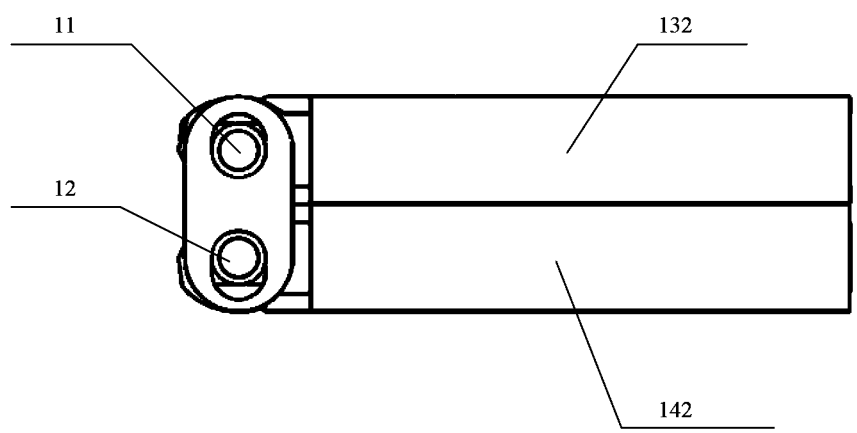
FIG. 15B is a side view when an opening and closing angle is 360° according to one embodiment.

FIG. 14A is a three-dimensional view when an opening and closing angle is 270° according to one embodiment. FIG. 14B is a side view when an opening and closing angle is 270° according to Embodiment 1 of this application. FIG. 15A is a three-dimensional view when an opening and closing angle is 360° according to one embodiment. FIG. 15B is a side view when an opening and closing angle is 360° according to one embodiment. When the opening and closing angle is changed from 180° to 360°, with rotation of the first rotating shaft 11 and the second rotating shaft 12, positions of the first body fastening part 132 and the second body fastening part 142 remain unchanged, and the distance between the axis of the first rotating shaft 11 and the axis of the second rotating shaft 12 remains unchanged.

In conclusion, according to the opening and closing mechanism provided in Embodiment 1, the sliding structure is implemented by using components such as the first sliding part and the elastic component, so that the opening and closing mechanism can implement 360° opening and closing in a telescopic manner. When the opening and closing angle of the opening and closing mechanism is 180°, it can be ensured that there is no gap or a small gap between two screens. Through the interference between the first interference part and the second interference part, a rotating shaft torsion force required by the opening and closing mechanism may be provided.

Embodiment 2

Figure 16:
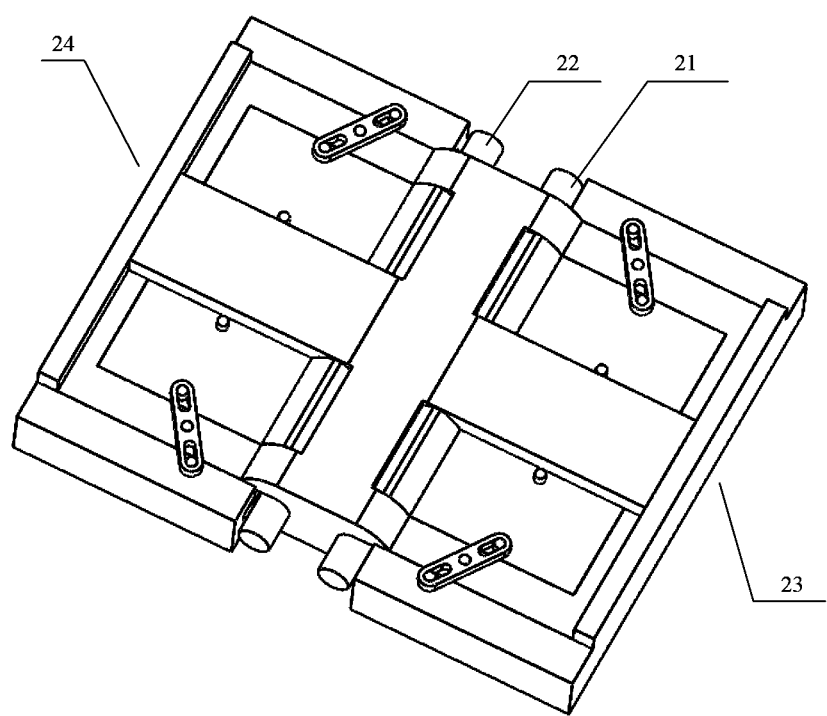
FIG. 16 is a schematic diagram of an entire mechanism of an opening and closing mechanism according to one embodiment.
Figure 17:
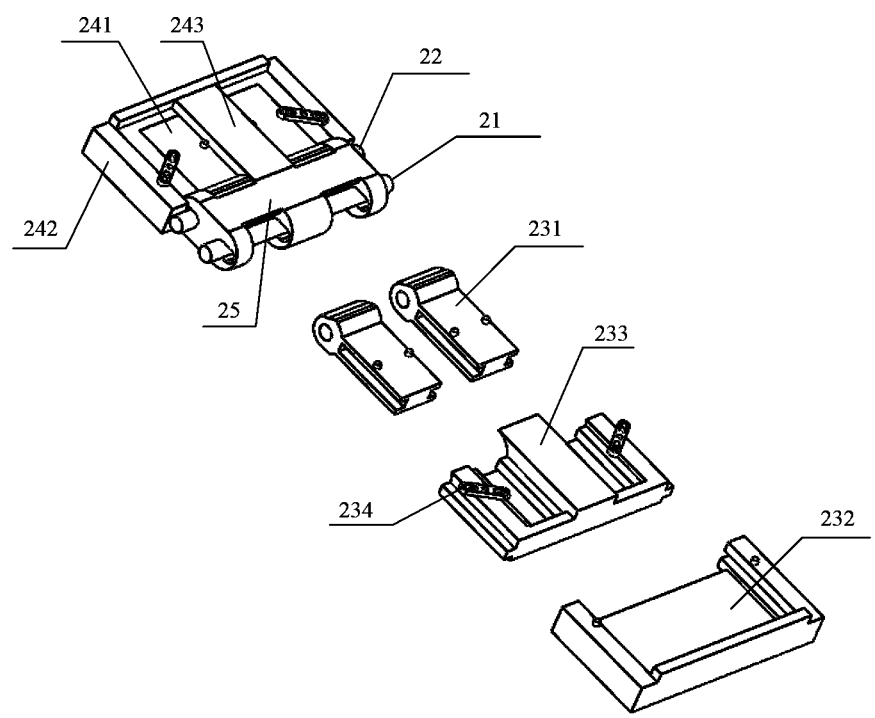
FIG. 17 is a schematic exploded diagram of an opening and closing mechanism according to one embodiment.

FIG. 16 is a schematic diagram of an entire mechanism of an opening and closing mechanism according to one embodiment. FIG. 17 is a schematic exploded diagram of an opening and closing mechanism according to one embodiment.

In this embodiment, a specific schematic diagram of the opening and closing structure is described by using an example in which an opening and closing angle is 180°. As shown in FIG. 16, the opening and closing mechanism includes a first rotating shaft 21 and a second rotating shaft 22 that are disposed in parallel, a first telescopic part 23 disposed on the first rotating shaft 21, and a second telescopic part 24 disposed on the second rotating shaft 22. The first rotating shaft 21 and the second rotating shaft 22 are rotationally connected.

As shown in FIG. 17, the first telescopic part 23 includes a first connection part 231 connected to the first rotating shaft 21 and a first body fastening part 232 that may slide along the first connection part 231, and the first body fastening part 232 is configured to fasten a first display screen.

The second telescopic part 24 includes a second connection part 241 connected to the second rotating shaft 22 and a second body fastening part 242 that may slide along the second connection part 241, and the second body fastening part 242 is configured to fasten a second display screen.

In a process in which the opening and closing angle is changed from 0° to 180°, the first body fastening part 232 slides toward the first rotating shaft 21, and the second body fastening part 242 slides toward the second rotating shaft 22.

In a process in which the opening and closing angle is changed from 180° to 360°, a distance between the first body fastening part 232 and the first rotating shaft 21 remains unchanged, and a distance between the second body fastening part 242 and the second rotating shaft 22 remains unchanged. The opening and closing angle is an angle between the first body fastening part 132 and the second body fastening part 142.

In one embodiment, the first body fastening part 232 is an open box structure, and the first connection part 231 is slidingly disposed in the first body fastening part 232.

As shown in FIG. 17, the first telescopic part 23 further includes a first sliding part 233 that is slidingly connected to the first connection part 231, and the first sliding part 233 may slide along the first connection part 231, to drive the first body fastening part 232 to slide along the first connection part 231. The second telescopic part 24 further includes a second sliding part 243 that is slidingly connected to the second connection part 241, and the second sliding part 243 may slide along the second connection part 241, to drive the second body fastening part 242 to slide along the second connection part 241.

In this embodiment, a structure of the first rotating shaft is the same as a structure of the second rotating shaft, and the structure of the first telescopic part is the same as the structure of the second telescopic part. Therefore, this embodiment is described by using the first rotating shaft and the first telescopic part as an example, and structures of the second rotating shaft and the second telescopic part are not described in detail again.

Figure 18:
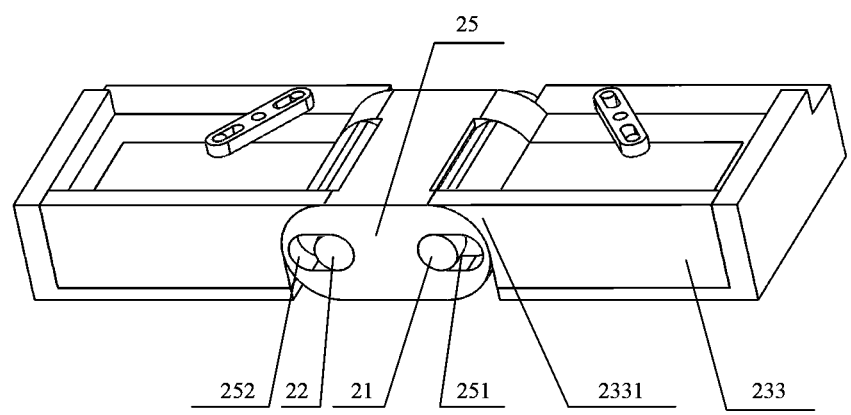
FIG. 18 is a sectional view of a first sliding part according to one embodiment.

With reference to FIG. 17 and FIG. 18, the following describes in detail a structure corresponding to sliding of the first sliding part along the first connection part in Embodiment 2. FIG. 18 is a sectional view of a first sliding part according to one embodiment.

As shown in FIG. 17 and FIG. 18, the opening and closing mechanism further includes a joint part 25, a part of the first rotating shaft 21 is rotationally disposed in the joint part 25, and a part of the second rotating shaft 22 is rotationally disposed in the joint part 25.

In one embodiment, the joint part 25 includes a first rotating hole 251 and a second rotating hole 252. The part of the first rotating shaft 21 is located in the first rotating hole 251, and the part of the second rotating shaft 22 is located in the second rotating hole 252. A diameter of the first rotating hole 251 is greater than a diameter of the first rotating shaft 21, and a diameter of the second rotating hole 252 is greater than a diameter of the second rotating shaft 22.

In one embodiment, a sharp convex part 2331 is disposed at an end that is of the first sliding part 233 and that is close to the joint part 25.

As shown in FIG. 18, when the opening and closing angle is 180°, a first surface of the sharp convex part 2331 and a surface of the joint part 25 are located in a same plane, and a second surface of the sharp convex part 2331 is fitted to the joint part 25.

In a process in which the opening and closing angle is changed from 0° to 180°, because the sharp convex part 2331 is a part protruding from the first sliding part 233, the sharp convex part 2331 interferes with the surface of the joint part 25, so that the first body fastening part 232 is disposed away from the first rotating shaft 21.

Specifically, the first telescopic part 23 further includes a chain part 234, and the chain part 234 is configured to connect the first body fastening part 232, the first connection part 231, and the first sliding part 233, and drives the first body fastening part 232 to slide when the first sliding part 233 slides along the first connection part 231.

As shown in FIG. 17, a hole is disposed on the chain part 234, and protrusions that can be fastened on the hole are disposed on the first connection part 231, the first sliding part 233, and the first body fastening part 232. Three holes are disposed on the chain part 234, a protrusion on the first sliding part 233 is disposed in a middle hole, a protrusion on the first connection part 231 is disposed in an inner side hole, and a protrusion on the first body fastening part 232 is disposed in an outer side hole.

The first sliding part 233 may slide relative to the first connection part 231, and the first body fastening part 232 may slide relative to the first sliding part 233. There are a plurality of manners of sliding the three relative to each other. As shown in FIG. 17, this embodiment provides a possible implementation. A first groove is disposed on the first connection part 231, and a sliding cavity accommodating the first sliding part 233 is disposed on the second sliding part 233. A first convex part matching the first groove is disposed in the sliding cavity, and the first convex part may slide in the first groove. A second convex part is disposed on an outer side of the first sliding part 233, a second groove matching the second convex part is disposed on the first body fastening part 232, and the second groove may slide along the second convex part.

In a process in which the opening and closing angle is changed from 180° to 0°, the sharp convex part 2331 interferes with the surface of the joint part 25, and the first sliding part 233 slides outward relative to the first connection part 231. In a process in which the first sliding part 233 slides outward, because of a function of the chain part 234, the first body fastening part 232 slides outward.

On the contrary, when the opening and closing angle is changed from 0° to 180°, the interference also occurs between the sharp convex part 2331 and the surface of the joint part 25, but the first sliding part 233 slides inward relative to the first connection part 231. In a process in which the first sliding part 233 slides inward, because of a function of the chain part 234, the first body fastening part 232 slides inward.

When the opening and closing angle is changed from 180° to 360°, because the second surface of the convex part 2331 is fitted to the joint part 25, the second sliding part 233 does not slide relative to the first connection part 231. In this embodiment, 360° opening and closing of the opening and closing mechanism is implemented by disposing the sharp convex part.

Figure 19:
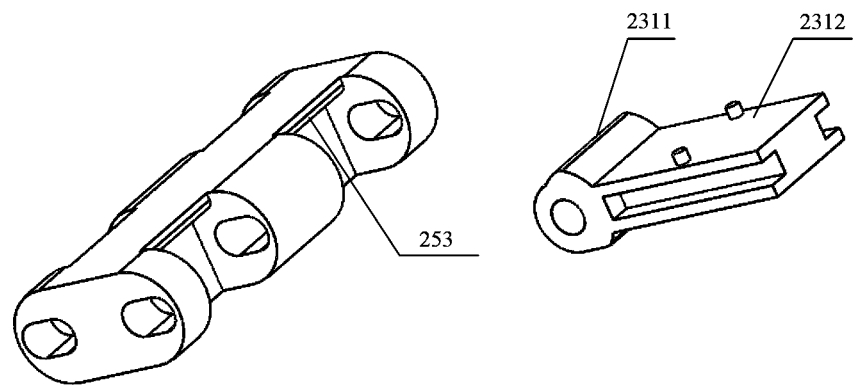
FIG. 19 is a schematic diagram of an interference structure according to one embodiment.
Figure 20:
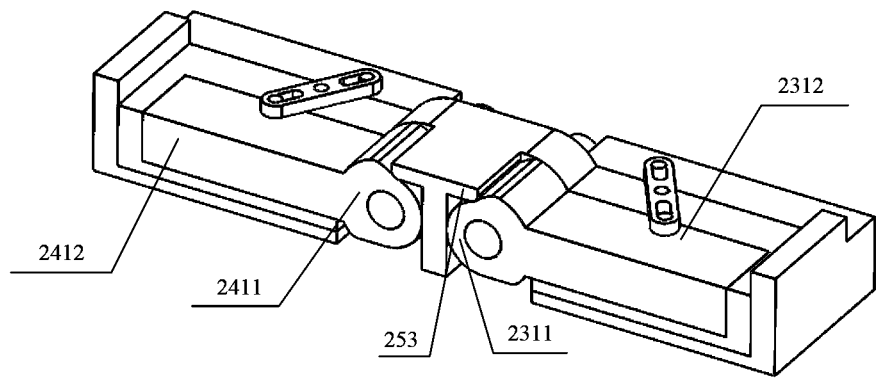
FIG. 20 is a sectional view of an interference part according to one embodiment.

The following describes in detail, with reference to FIG. 17, FIG. 19, and FIG. 20, a structure in which the opening and closing mechanism generates a torsion force according to one embodiment. FIG. 19 is a schematic diagram of an interference structure according to one embodiment. FIG. 20 is a sectional view of an interference part according to one embodiment.

As shown in FIG. 17, FIG. 19, and FIG. 20, the first connection part 231 includes a first interference part 2311 sleeved on the first rotating shaft 21 and a first supporting part 2312 connected to the first interference part 2311, and the first body fastening part 232 may slide along the first supporting part 2312. The second connection part 241 includes a second interference part 2411 sleeved on the second rotating shaft 22 and a second supporting part 2412 connected to the second interference part 2411, and the second body fastening part 242 may slide along the second supporting part 2412. In a process in which the opening and closing angle is changed from 0° to 180°, the first interference part 2311 and the second interference part 2411 are in an interference state.

Specifically, a third interference part 253 is disposed on one side of the joint part 25. When the opening and closing angle is 180°, a structure of the third interference part 253 and the first interference part 2311 is shown in FIG. 20. In a process in which the opening and closing angle is changed from 180° to 360°, the third interference part 253 is fitted to the first interference part 2311. In a process in which the opening and closing angle is changed from 0° to 180°, the first interference part 2311 interferes with the third interference part 253, to generate a torsion force, and maintain the opening and closing angle between the first display screen and the second display screen.

A person skilled in the art may understand that because the first interference part 1311 and the third interference part 253 exist, a distance between an axis of the first rotating shaft 21 and an axis of the second rotating shaft 22 changes. When the opening and closing angle is 180°, the distance between two axes is a first distance, and when the opening and closing angle is 0°, the distance between the two axes is a second distance. Because no interference exists when the opening and closing angle is 180°, and the interference exists when the opening and closing angle is 0°, the first distance is less than the second distance. The diameter of the first rotating hole 251 is greater than the diameter of the first rotating shaft 21, and the diameter of the second rotating hole 252 is greater than the diameter of the second rotating shaft 22, which provides distance space for the foregoing distance change, and ensures generation of an interference process.

The following describes in detail, with reference to FIG. 21 to FIG. 25, forms of the opening and closing mechanism from different angles according to one embodiment.

Figure 21A:
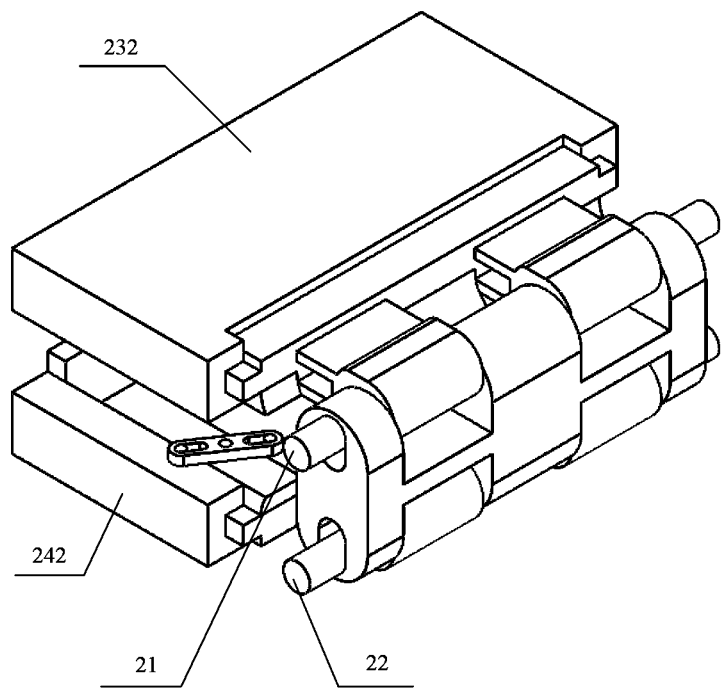
FIG. 21A is a three-dimensional view when an opening and closing angle is 0° according to one embodiment.
Figure 21B:
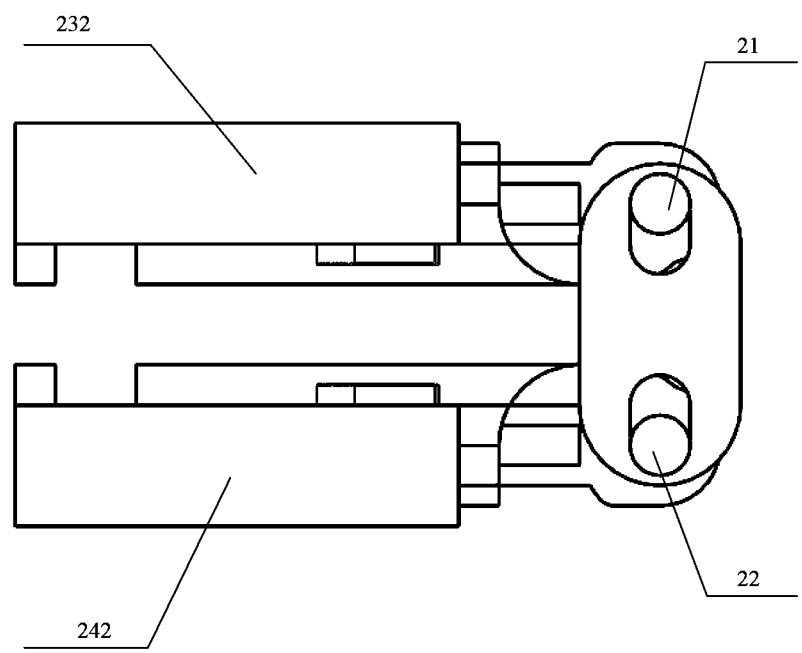
FIG. 21B is a side view when an opening and closing angle is 0° according to one embodiment.

FIG. 21A is a three-dimensional view when an opening and closing angle is 0° according to one embodiment. FIG. 21B is a side view when an opening and closing angle is 0° according to one embodiment. As shown in FIG. 21A, the first body fastening part 232 is disposed away from the first rotating shaft 21, and the second body fastening part 242 is disposed away from the second rotating shaft 22. Because of the interference between the first interference part and the third interference part and interference between the second interference part and the third interference part, the distance between the axis of the first rotating shaft 21 and the axis of the second rotating shaft 22 is the longest.

Figure 22A:
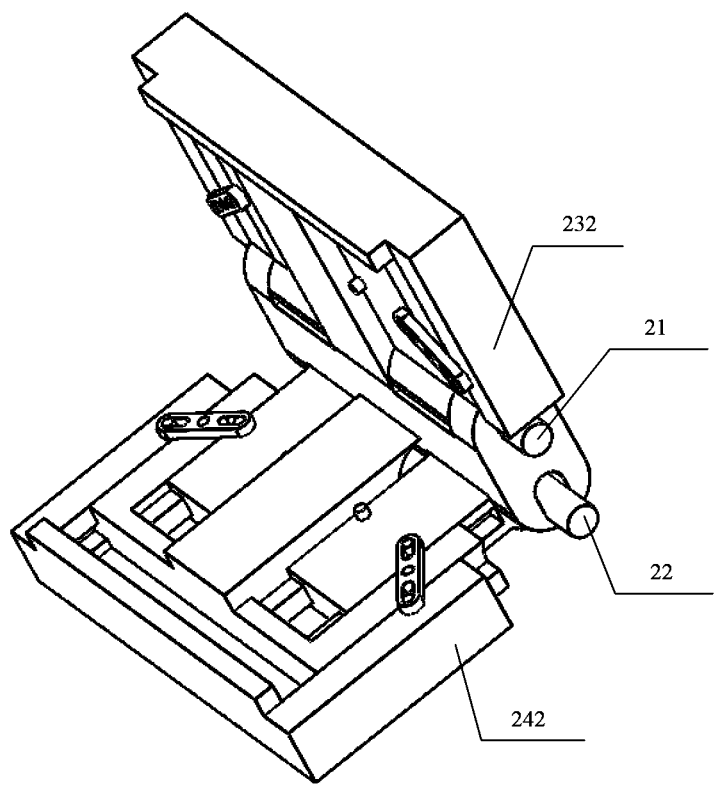
FIG. 22A is a three-dimensional view when an opening and closing angle is 90° according to one embodiment.
Figure 22B:
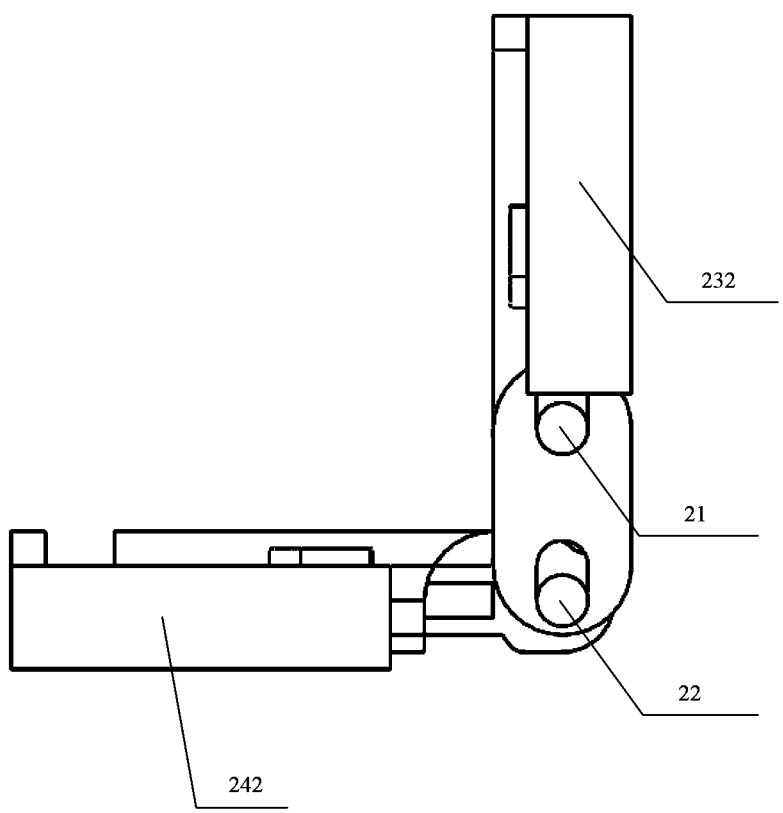
FIG. 22B is a side view when an opening and closing angle is 90° according to one embodiment.

FIG. 22A is a three-dimensional view when an opening and closing angle is 90° according to one embodiment. FIG. 22B is a side view when an opening and closing angle is 90° according to one embodiment. As shown in FIG. 22A, the first body fastening part 232 is disposed near the first rotating shaft 21, and the second body fastening part 242 is disposed away from the second rotating shaft 22. As shown in FIG. 22B, the distance between the axis of the first rotating shaft 21 and the axis of the second rotating shaft 22 is smaller than that in FIG. 21B.

Figure 23A:
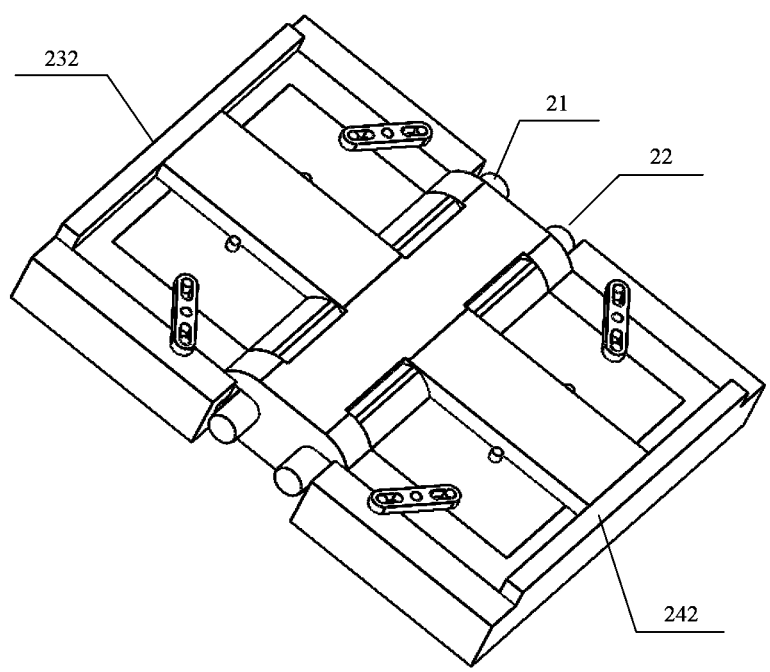
FIG. 23A is a three-dimensional view when an opening and closing angle is 180° according to one embodiment.
Figure 23B:
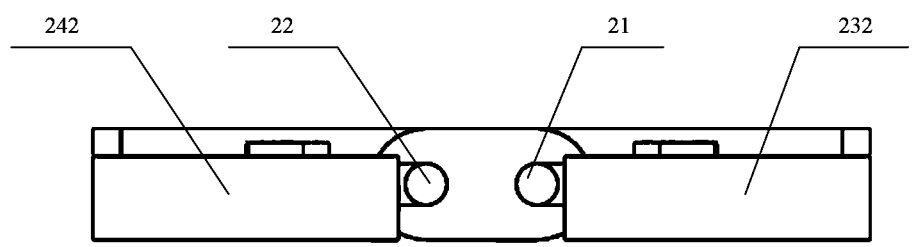
FIG. 23B is a side view when an opening and closing angle is 180° according to one embodiment.

FIG. 23A is a three-dimensional view when an opening and closing angle is 180° according to one embodiment. FIG. 23B is a side view when an opening and closing angle is 180° according to one embodiment. As shown in FIG. 23A, the first body fastening part 232 is disposed near the first rotating shaft 21, and the second body fastening part 242 is disposed near the second rotating shaft 22. As shown in FIG. 23B, no interference is generated between the first interference part and the third interference part, no interference is generated between the second interference part and the third interference part, the distance between the axis of the first rotating shaft 21 and the axis of the second rotating shaft 22 is smaller than that in FIG. 22B, and the distance between the axis of the first rotating shaft 21 and the axis of the second rotating shaft 22 is the smallest.

Figure 24A:
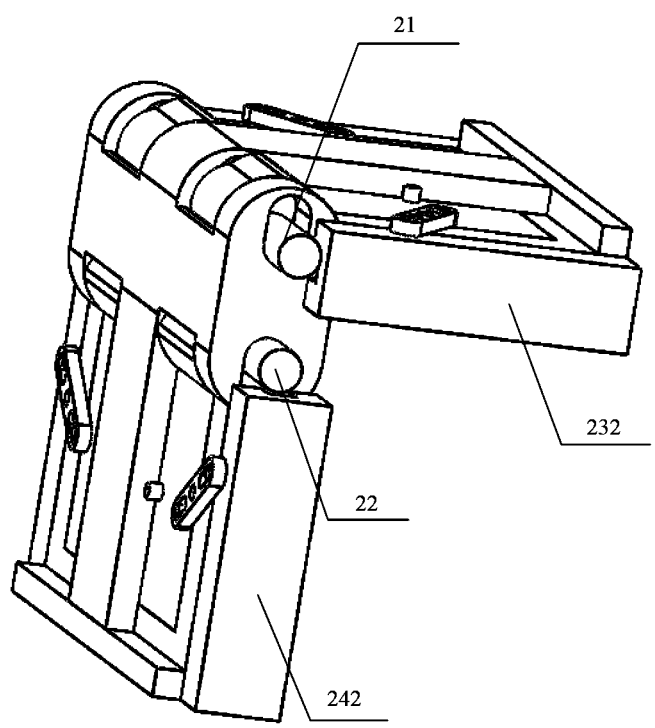
FIG. 24A is a three-dimensional view when an opening and closing angle is 270° according to one embodiment.
Figure 24B:
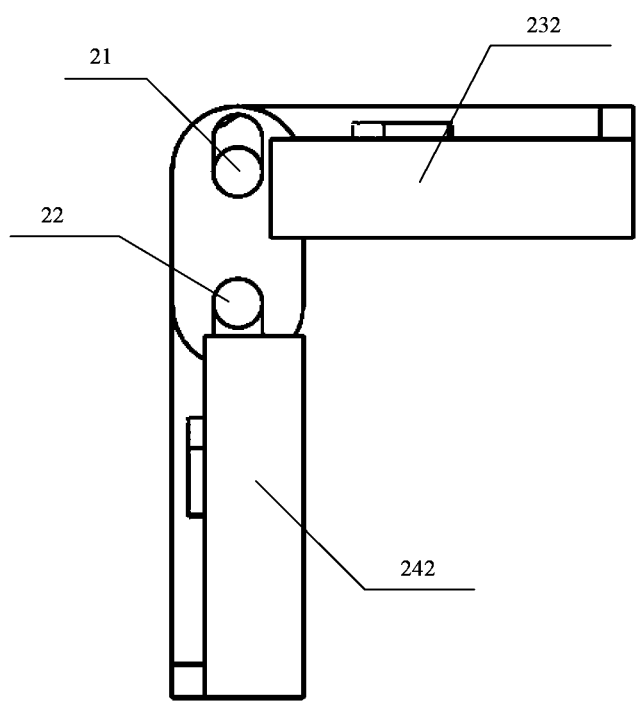
FIG. 24B is a side view when an opening and closing angle is 270° according to one embodiment.
Figure 25A:
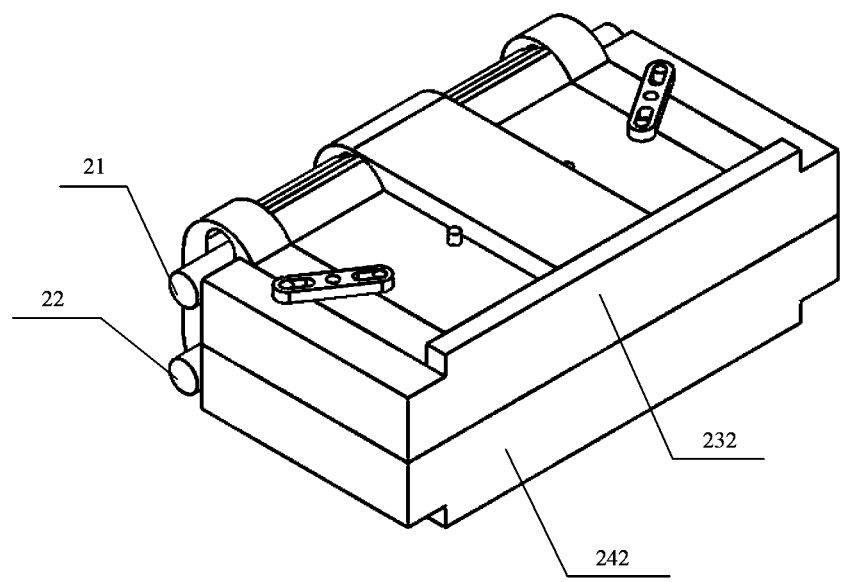
FIG. 25A is a three-dimensional view when an opening and closing angle is 360° according to one embodiment.
Figure 25B:
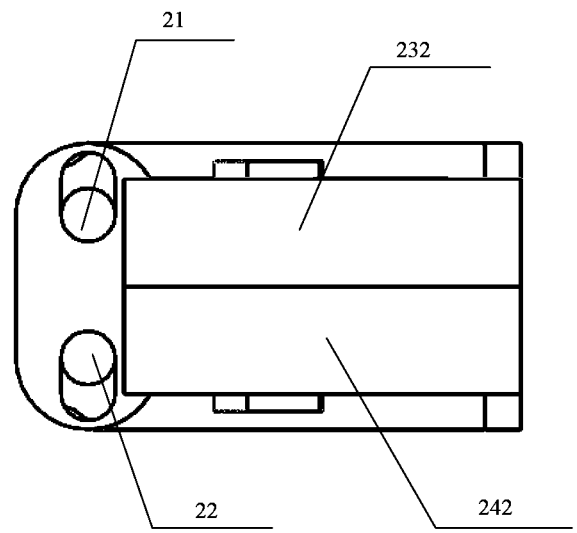
FIG. 25B is a side view when an opening and closing angle is 360° according to one embodiment.

FIG. 24A is a three-dimensional view when an opening and closing angle is 270° according to one embodiment. FIG. 24B is a side view when an opening and closing angle is 270° according to one embodiment. FIG. 25A is a three-dimensional view when an opening and closing angle is 360° according to one embodiment. FIG. 25B is a side view when an opening and closing angle is 360° according to one embodiment. When the opening and closing angle is changed from 180° to 360°, with rotation of the first rotating shaft 21 and the second rotating shaft 22, positions of the first body fastening part 232 and the second body fastening part 242 remain unchanged, and the distance between the axis of the first rotating shaft 21 and the axis of the second rotating shaft 22 remains unchanged.

In conclusion, according to the opening and closing mechanism provided in Embodiment 2, the sliding structure is implemented by using components such as the sharp convex part and the joint part on the first sliding part, so that the opening and closing mechanism can implement 360° opening and closing in a telescopic manner. When the opening and closing angle of the opening and closing mechanism is 180°, it can be ensured that there is no gap or a small gap between two screens. Through the interference between the first interference part and the third interference part and the interference between the second interference part and the third interference part, a rotating shaft torsion force required by the opening and closing mechanism may be provided.

This embodiment of this application further provides an electronic device. The electronic device includes a first body, a second body, and the opening and closing mechanism that is of a notebook computer and that is described above. The first body is connected to the first body fastening part, and the second body is connected to the second body fastening part. In the following embodiments, an example in which the electronic device is a notebook computer, the first body is the first display screen, and the second body is the second display screen is used for detailed description. With reference to the Embodiment 1 and Embodiment 2, the following describes a structure of the notebook computer in detail by using Embodiment 3 and Embodiment 4.

The notebook computer in Embodiment 3 uses the opening and closing mechanism in Embodiment 1, and the notebook computer in Embodiment 4 uses the opening and closing mechanism in Embodiment 2.

Embodiment 3

Figure 26A:
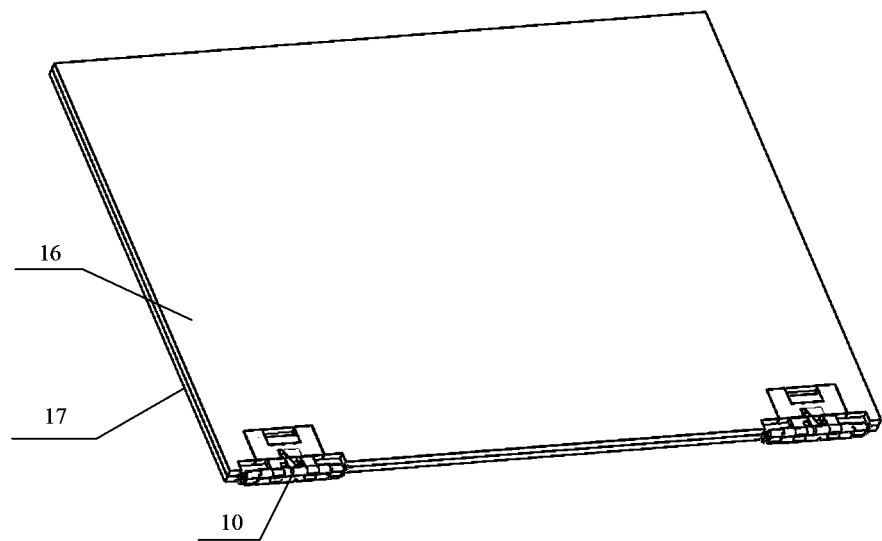
FIG. 26A is a schematic structural diagram of a notebook computer when an opening and closing angle is 0° according to one embodiment.
Figure 26B:
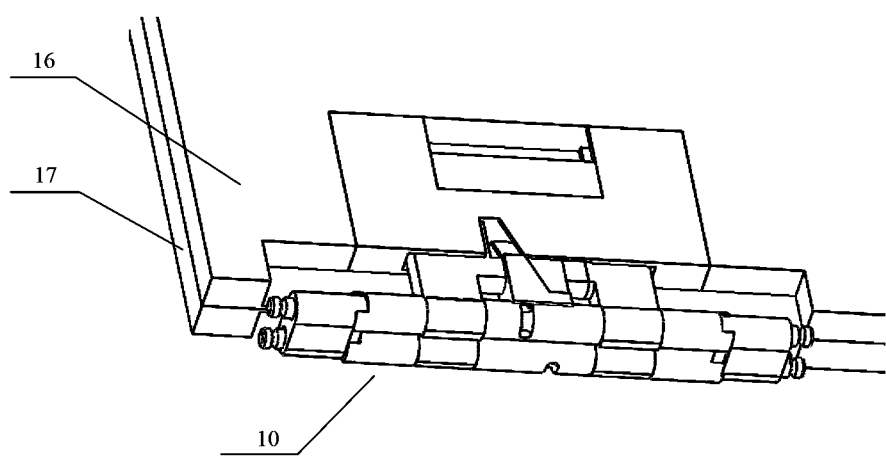
FIG. 26B is a partial enlarged diagram of FIG. 26A according to one embodiment.

FIG. 26A is a schematic structural diagram of a notebook computer when an opening and closing angle is 0° according to one embodiment. FIG. 26B is a partial enlarged diagram of FIG. 26A according to one embodiment. As shown in FIG. 26A and FIG. 26B, when the opening and closing angle is 0°, a first display screen 16 and a second display screen 17 extend outward, and a rotating shaft of an opening and closing mechanism 10 is located outside the first display screen 16 and the second display screen 17.

Figure 27A:
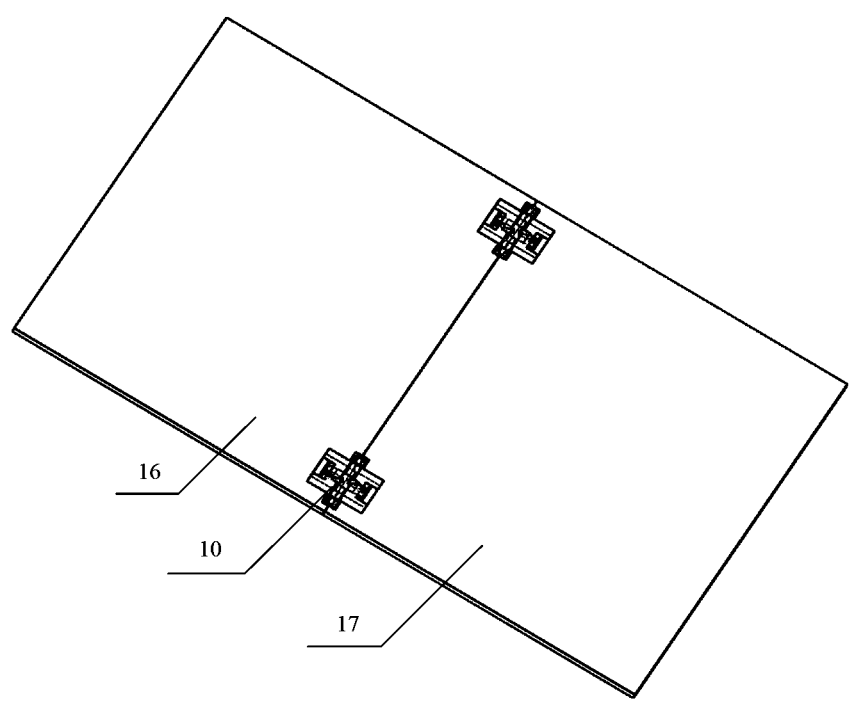
FIG. 27A is a schematic structural diagram of a notebook computer when an opening and closing angle is 180° according to one embodiment.
Figure 27B:
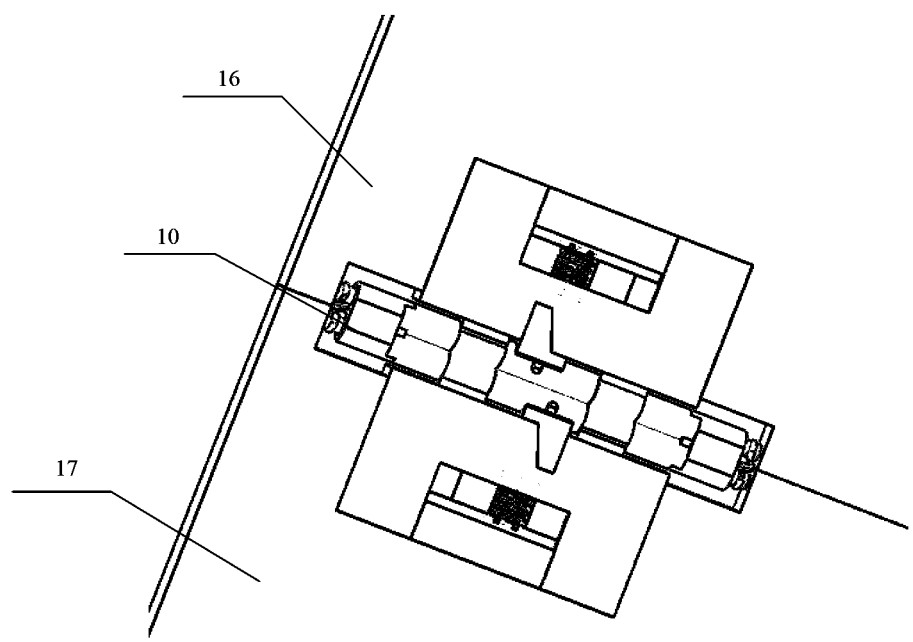
FIG. 27B is a partial enlarged diagram of FIG. 27A according to one embodiment.

FIG. 27A is a schematic structural diagram of a notebook computer when an opening and closing angle is 180° according to one embodiment. FIG. 27B is a partial enlarged diagram of FIG. 27A according to one embodiment. As shown in FIG. 27A and FIG. 27B, the first display screen 16 and the second display screen 17 are aligned, and the opening and closing mechanism 10 is invisible from a screen side (for illustration, the opening and closing mechanism is illustrated in this embodiment).

Figure 28A:
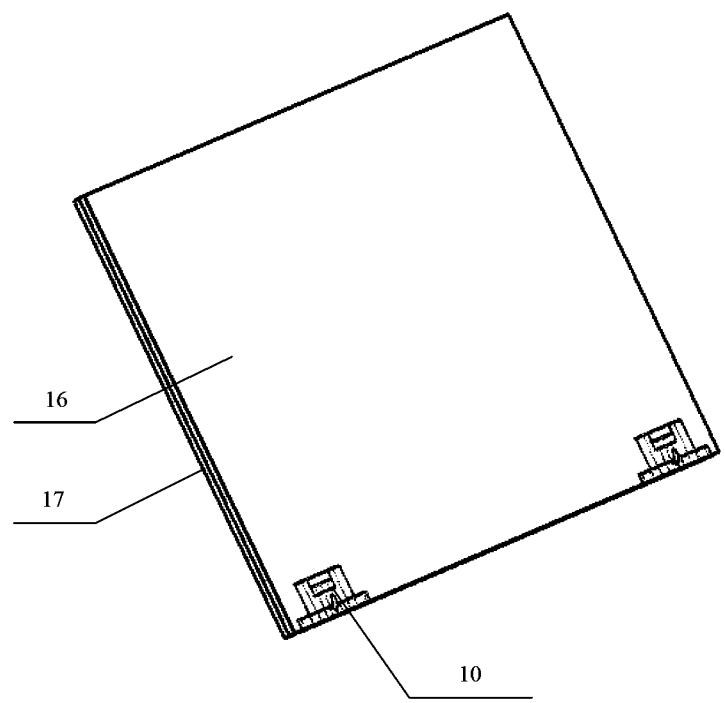
FIG. 28A is a schematic structural diagram of a notebook computer when an opening and closing angle is 360° according to one embodiment.
Figure 28B:
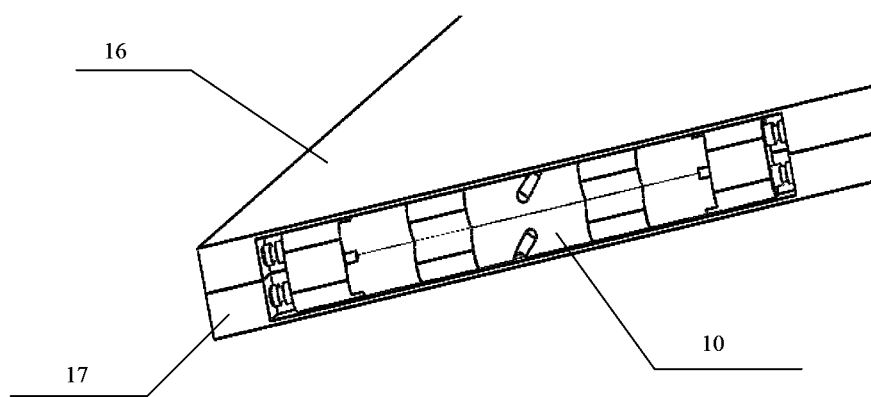
FIG. 28B is a partial enlarged diagram of FIG. 28A according to one embodiment.

FIG. 28A is a schematic structural diagram of a notebook computer when an opening and closing angle is 360° according to one embodiment. FIG. 28B is a partial enlarged diagram of FIG. 28A according to one embodiment. As shown in FIG. 28A and FIG. 28B, the opening and closing mechanism is accommodated in a body, so that the notebook computer can be used as a tablet computer.

Embodiment 4

Figure 29A:
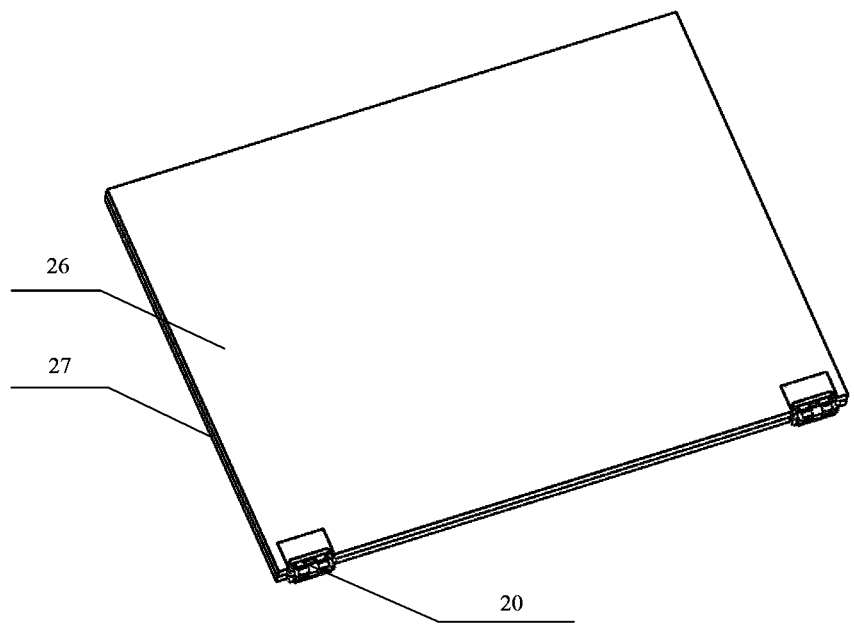
FIG. 29A is a schematic structural diagram of a notebook computer when an opening and closing angle is 0° according to one embodiment.
Figure 29B:
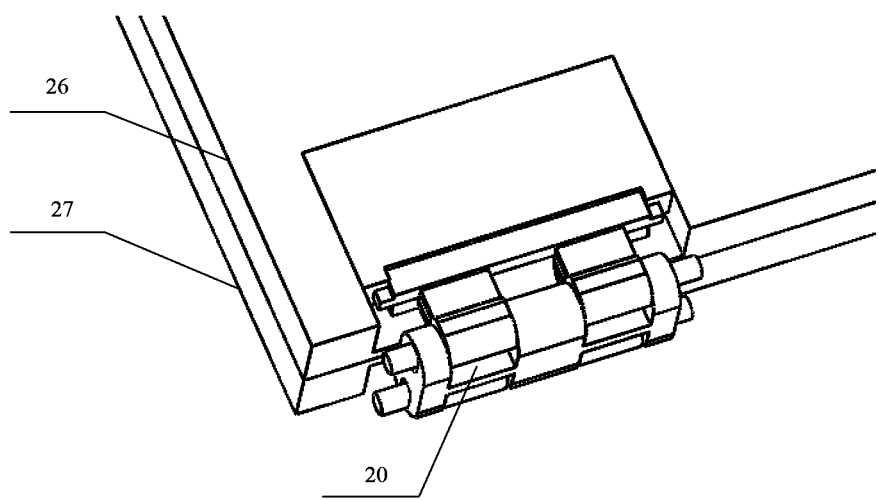
FIG. 29B is a partial enlarged diagram of FIG. 29A according to one embodiment.

FIG. 29A is a schematic structural diagram of a notebook computer when an opening and closing angle is 0° according to one embodiment. FIG. 29B is a partial enlarged diagram of FIG. 29A according to one embodiment. As shown in FIG. 29A and FIG. 29B, when the opening and closing angle is 0°, a first display screen 26 and a second display screen 27 extend outward, and a rotating shaft of an opening and closing mechanism 20 is located outside the first display screen 26 and the second display screen 27.

Figure 30A:
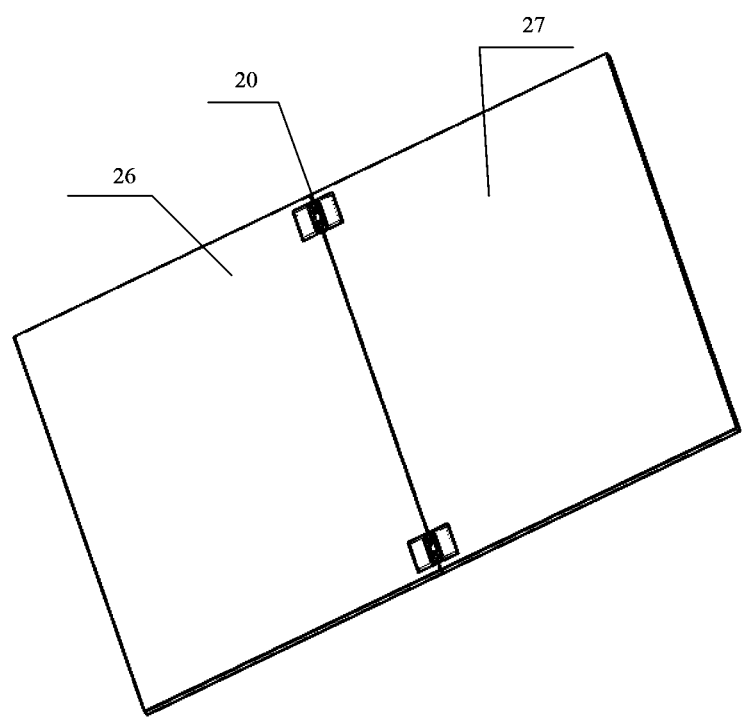
FIG. 30A is a schematic structural diagram of a notebook computer when an opening and closing angle is 180° according to one embodiment.
Figure 30B:
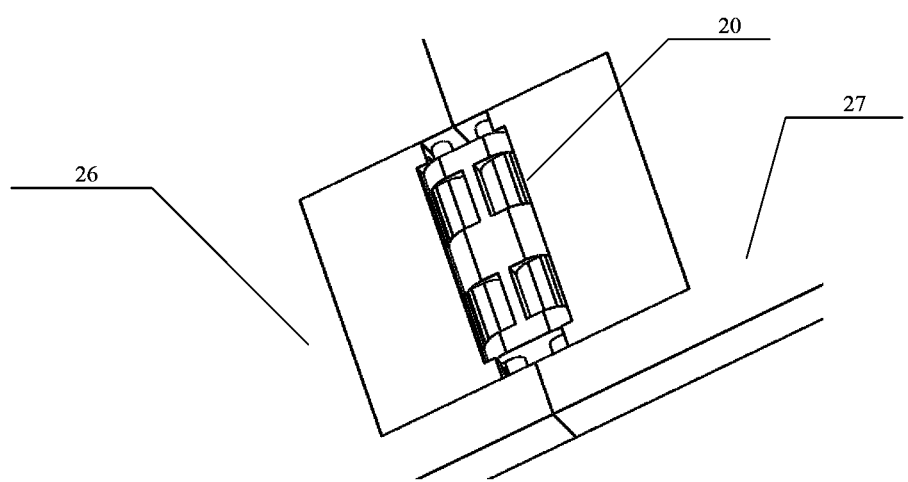
FIG. 30B is a partial enlarged diagram of FIG. 30A according to one embodiment.

FIG. 30A is a schematic structural diagram of a notebook computer when an opening and closing angle is 180° according to one embodiment. FIG. 30B is a partial enlarged diagram of FIG. 30A according to one embodiment. As shown in FIG. 30A and FIG. 30B, the first display screen 26 and the second display screen 27 are aligned, the opening and closing mechanism 20 is invisible from a screen side (for illustration, the opening and closing mechanism is illustrated in this embodiment).

Figure 31A:
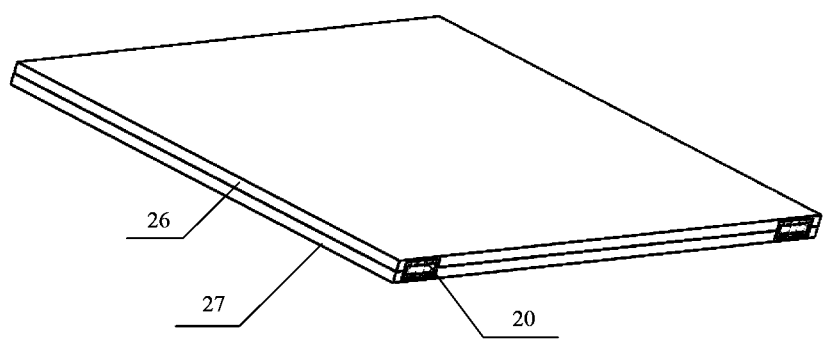
FIG. 31A is a schematic structural diagram of a notebook computer when an opening and closing angle is 360° according to one embodiment.
Figure 31B:
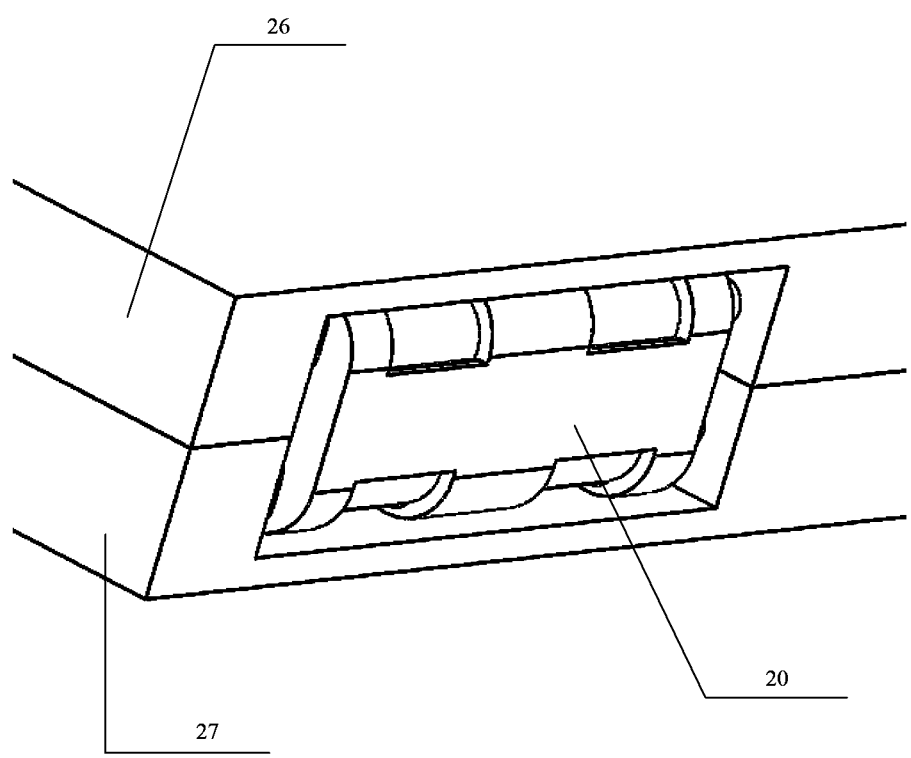
FIG. 31B is a partial enlarged diagram of FIG. 31A according to one embodiment.

FIG. 31A is a schematic structural diagram of a notebook computer when an opening and closing angle is 360° according to one embodiment. FIG. 31B is a partial enlarged diagram of FIG. 31A according to one embodiment. As shown in FIG. 31A and FIG. 31B, the opening and closing mechanism is accommodated in a body, so that the notebook computer can be used as a tablet computer.

Based on the foregoing Embodiment 3 and Embodiment 4, other opening and closing angles of the notebook computer may be obtained by making various variations on FIG. 26 to FIG. 31 with reference to FIG. 11 to FIG. 15 and FIG. 21 to FIG. 25. Details are not described herein again in this embodiment.

In conclusion, in Embodiment 3 and Embodiment 4, when the opening and closing angle between the first display screen and the second display screen is 180°, the first display screen and the second display screen are disposed side by side, and there is no gap between the first display screen and the second display screen, so that a full-screen effect can be achieved. When the opening and closing angle between the first display screen and the second display screen is changed from 180° to 360°, a distance between the first display screen and the first rotating shaft remains unchanged, and a distance between the second display screen and the second rotating shaft remains unchanged. When the angle between the first display screen and the second display screen is 360°, the notebook computer is used as a tablet computer. When the opening and closing angle between the first display screen and the second display screen is changed from 180° to 0°, the first display screen moves away from the first rotating shaft, and the second display screen moves away from the second rotating shaft, to avoid interference of the first rotating shaft and the second rotating shaft on the first display screen and the second display screen, avoid scratching the display screen, and ensure that the notebook computer is opened and closed at 360°.

What is claimed is:

1. An opening and closing mechanism, comprising:
a first rotating shaft and a second rotating shaft that are disposed in parallel;
a first telescopic part disposed on the first rotating shaft, and a second telescopic part disposed on the second rotating shaft, wherein the first rotating shaft and the second rotating shaft are rotationally connected;
the first telescopic part comprises a first connection part connected to the first rotating shaft and a first body fastening part slidable along the first connection part, wherein the first body fastening part is fastened to a first body of an electronic device;
the second telescopic part comprises a second connection part connected to the second rotating shaft and a second body fastening part slidable along the second connection part, wherein the second body fastening part is fastened to a second body of the electronic device;
in a process in which an opening and closing angle is changed from 0° to 180°, the first body fastening part slides toward the first rotating shaft, and the second body fastening part slides toward the second rotating shaft; and
in a process in which the opening and closing angle is changed from 180° to 360°, a distance between the first body fastening part and the first rotating shaft remains unchanged, and a distance between the second body fastening part and the second rotating shaft remains unchanged, wherein the opening and closing angle is an angle between the first body fastening part and the second body fastening part.

2. The opening and closing mechanism according to claim 1, wherein the first telescopic part further comprises a first sliding part that is slidingly connected to the first connection part, and the first sliding part slidable along the first connection part, to drive the first body fastening part to slide along the first connection part; and
the second telescopic part further comprises a second sliding part that is slidingly connected to the second connection part, and the second sliding part slidable along the second connection part, to drive the second body fastening part to slide along the second connection part.

3. The opening and closing mechanism according to claim 2, wherein the first connection part comprises a first interference part sleeved on the first rotating shaft and a first supporting part connected to the first interference part, and the first body fastening part slidable along the first supporting part;
the second connection part comprises a second interference part sleeved on the second rotating shaft and a second supporting part connected to the second interference part, and the second body fastening part slidable along the second supporting part; and
in a process in which the opening and closing angle is changed from 0° to 180°, the first interference part and the second interference part are in an interference state.

4. The opening and closing mechanism according to claim 3, wherein a sliding shaft is disposed on an outer circumferential surface of the first rotating shaft, a sliding groove is disposed on the sliding shaft, and the first sliding part slidable around the sliding groove, so that the first sliding part slides along the first connection part, to drive the first body fastening part to slide along the first connection part.

5. The opening and closing mechanism according to claim 4, wherein the sliding groove comprises an inclined groove and a straight groove that are connected, and a sliding point is disposed on a first side surface of the first sliding part;
in a process in which the opening and closing angle is changed from 0° to 180°, the sliding point slidable in the inclined groove, so that the first sliding part slides along the first connection part; and
in a process in which the opening and closing angle is changed from 180° to 360°, the sliding point slidable in the straight groove, so that the first sliding part and the first connection part are relatively stationary.

6. The opening and closing mechanism according to claim 5, wherein a groove is disposed on a second side surface of the first sliding part, the groove slidable along the first connection part, and the second side surface is disposed opposite to the first side surface.

7. The opening and closing mechanism according to claim 4, wherein an inclined body is disposed on a surface of the first sliding part, and a sliding opening matching the inclined body is disposed on the first body fastening part;
in a process in which the opening and closing angle is changed from 0° to 180°, the sliding opening slidable along the inclined body; and
in a process in which the opening and closing angle is changed from 180° to 360°, the sliding opening and the inclined body are relatively stationary.

8. The opening and closing mechanism according to claim 4, wherein the first telescopic part further comprises an elastic component and a position-limiting part disposed at an end that is of the first connection part and that is away from the first rotating shaft;
  one end of the elastic component presses against the first body fastening part, and the other end of the elastic component presses against the position-limiting part; and
  the elastic component is configured to pull the first body fastening part back from a position away from the first rotating shaft to a position close to the first rotating shaft.

9. The opening and closing mechanism according to claim 8, wherein a position-limiting step is disposed on a side surface of the position-limiting part, and when the opening and closing angle is 0°, a part of the first body fastening part presses against the position-limiting step.

10. The opening and closing mechanism according to claim 4, wherein the first interference part is a C-shaped interference part; and
  when the opening and closing angle is 0° to 180°, the first interference part interferes with the second interference part.

11. The opening and closing mechanism according to claim 4, wherein the first body fastening part is a housing structure, and the first body fastening part is sleeved outside the first connection part.

12. The opening and closing mechanism according to claim 1, further comprising a joint part, wherein
  a part of the first rotating shaft is rotationally disposed in the joint part, and a part of the second rotating shaft is rotationally disposed in the joint part.

13. The opening and closing mechanism according to claim 3, further comprising a joint part, wherein
  a part of the first rotating shaft is rotationally disposed in the joint part, and a part of the second rotating shaft is rotationally disposed in the joint part.

14. The opening and closing mechanism according to claim 13, wherein a sharp convex part is disposed at an end that is of the first sliding part and that is close to the joint part;
  when the opening and closing angle is 180°, a first surface of the sharp convex part and a surface of the joint part are located in a same plane, and a second surface of the sharp convex part is fitted to the joint part; and
  in a process in which the opening and closing angle is changed from 0° to 180°, the sharp convex part interferes with the surface of the joint part, so that the first body fastening part is disposed away from the first rotating shaft.

15. The opening and closing mechanism according to claim 14, wherein a third interference part is disposed on one side of the joint part; and
  in a process in which the opening and closing angle is changed from 0° to 180°, the first interference part interferes with the third interference part.

16. The opening and closing mechanism according to claim 13, wherein the first telescopic part further comprises a chain part configured to connect the first body fastening part, the first connection part, and the first sliding part, and drive the first body fastening part to slide when the first sliding part slides along the first connection part.

17. The opening and closing mechanism according to claim 13, wherein the first body fastening part is an open box structure, and the first connection part is slidingly disposed in the first body fastening part.

18. The opening and closing mechanism according to claim 12, wherein the joint part comprises a first rotating hole and a second rotating hole, the part of the first rotating shaft is located in the first rotating hole, and the part of the second rotating shaft is located in the second rotating hole, and a diameter of the first rotating hole is greater than a diameter of the first rotating shaft, and a diameter of the second rotating hole is greater than a diameter of the second rotating shaft.

19. The opening and closing mechanism according to claim 4, wherein a structure of the first rotating shaft is the same as a structure of the second rotating shaft, and a structure of the first telescopic part is the same as a structure of the second telescopic part.

20. An electronic device, comprising:
  a first body;
  a second body; and
  an opening and closing mechanism comprising:
  a first rotating shaft and a second rotating shaft that are disposed in parallel, a first telescopic part disposed on the first rotating shaft, and a second telescopic part disposed on the second rotating shaft, wherein the first rotating shaft and the second rotating shaft are rotationally connected,
  the first telescopic part comprises a first connection part connected to the first rotating shaft and a first body fastening part slidable along the first connection part, wherein the first body fastening part is fastened to the first body of the electronic device,
  the second telescopic part comprises a second connection part connected to the second rotating shaft and a second body fastening part slidable along the second connection part, wherein the second body fastening part is fastened to the second body of the electronic device,
  in a process in which an opening and closing angle is changed from 0° to 180°, the first body fastening part slides toward the first rotating shaft, and the second body fastening part slides toward the second rotating shaft, and
  in a process in which the opening and closing angle is changed from 180° to 360°, a distance between the first body fastening part and the first rotating shaft remains unchanged, and a distance between the second body fastening part and the second rotating shaft remains unchanged, wherein the opening and closing angle is an angle between the first body fastening part and the second body fastening part.

* * * * *